US007016844B2

(12) United States Patent
Othmer et al.

(10) Patent No.: US 7,016,844 B2
(45) Date of Patent: Mar. 21, 2006

(54) SYSTEM AND METHOD FOR ONLINE TRANSCRIPTION SERVICES

(75) Inventors: Konstantin Othmer, Mountain View, CA (US); Michael P. Ruf, Parkland, FL (US)

(73) Assignee: Core Mobility, Inc., Mountain View, CA (US)

( * ) Notice: Subject to any disclaimer, the term of this patent is extended or adjusted under 35 U.S.C. 154(b) by 750 days.

(21) Appl. No.: 10/255,998

(22) Filed: Sep. 26, 2002

(65) Prior Publication Data

US 2004/0064317 A1    Apr. 1, 2004

(51) Int. Cl.
*G10L 15/26*    (2006.01)
(52) U.S. Cl. .................................... 704/270.1; 704/235
(58) Field of Classification Search ...................... None
See application file for complete search history.

(56) References Cited

U.S. PATENT DOCUMENTS

| | | | |
|---|---|---|---|
| 5,179,627 A | 1/1993 | Sweet et al. ................... 395/2 |
| 6,122,613 A | 9/2000 | Baker .......................... 704/325 |
| 6,122,614 A | 9/2000 | Kahn et al. ................... 704/235 |
| 2003/0046350 A1 * | 3/2003 | Chintalapati et al. ........ 709/206 |

* cited by examiner

*Primary Examiner*—David D. Knepper
(74) *Attorney, Agent, or Firm*—Workman Nydegger

(57) ABSTRACT

A system and method for providing a transcription service over a network. The transcription service includes a transcription server, a database, and several communication gateways. A transcription request is received by the system from anyone and includes an audio file, transcription instructions are derived by the system from a requestor profile, from preferences submitted with the audio file, or both. The request is then processed by the transcription server, the audio file is transmitted to at least one transcriber for transcription, transcribers receive the audio file, transcribe the file, and send the transcription back to the transcription server. The transcription server processes the file and sends the transcription to the entity that requested the transcription. Transcription accuracy is validated statistically by the system, thereby enabling reliable transcription from unknown transcription nodes. Profiles may be configured for both transcribers and transcription requestors. A rating and other performance metrics may be generated, monitored and maintained by the transcription system for a transcriber.

84 Claims, 13 Drawing Sheets

SYSTEM AND METHOD FOR ONLINE TRANSCRIPTION SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The current invention relates generally to transcription services, and more particularly to providing a high quality transcription service over a network.

2. Background of the Invention

Transcriptions traditionally consist of a person listening to an audio source and typing text that corresponds to the audio. Entities that provide transcription services typically employ transcribers to transcribe audio provided from clients. The entities have expenses that include transcriber compensation, overhead, equipment and other expenses involved with operating a business. Accordingly, the pricing for their transcription services must support these expenses. The result is that the pricing associated with traditional transcription services makes them inaccessible to many potential consumers. Further, such entities typically have a business model that requires minimum volumes of transcription work, thus precluding potential consumers who have infrequent transcription needs or very small transcription requests. Consequently, these services are usually employed only for high-value transcriptions typically in the medical or legal fields.

Security and privacy is also an issue for current professional transcription entities. Although steps may be taken to maintain the anonymity of the service requester, the content itself is not protected. Transcribers that provide services on their own may provide less expensive transcription services, but their security and privacy measures are inadequate. Also, their reliability and accuracy may be substandard compared to an established firm or entity. Further, sourcing transcription services, whether from a service entity or individual transcriber, is a cumbersome, time-consuming process that often involves negotiation and contractual obligations.

Automatic transcription using speech recognition techniques has been attempted, but has many disadvantages. Though speech recognition techniques may be less expensive than traditional transcription services, they are unreliable and they are not suitable for recognizing free form speech when used across a large population of users. There are two approaches. First, for large populations of users an approach is used where words from a list are recognized. This works well in situations such as interactive voice response (IVR) systems where there is a finite set of words to choose from. A second approach involves "training" a system to recognize the speech of a particular user. While this technique can be made to work well for one individual, the technique is not a viable solution for a larger population of users. The result is that there is no good automated solution for converting speech to text across a large range of users with variable voices, intonations, dialects and languages.

A recent entrant into the transcription services market is a company called CopyTalk, which provides transcription services for Palm OS compatible devices, using human transcribers to execute voice to text conversion. CopyTalk requires users to subscribe to a membership which allows them to place a phone call and dictate instructions for sending emails, documenting "to do's", inserting appointments into a calendar, or dictate a memo. Specifically, the CopyTalk service is aimed at allowing users to manipulate the information in their desktop personal organizers or send emails.

CopyTalk's functionally is narrowly focused on the desktop applications and devices it supports. It requires the user to install special software to have access to the service, and it employs transcribers to do the work, resulting in an inability to scale the service to accommodate large numbers of users for real time transcription at low cost. Significantly, the service does not provide for the security of the content submitted by the user, so the transcriber is privy to potentially sensitive information. Content cannot be prioritized by type or source, nor can it be routed to certain transcribers with special skills. The service does not have an effective quality assurance or feedback system with the exception of an assurance that the user does not have to pay for inadequate work. The security and quality assurance mechanisms for this service are inadequate for serious business applications that may involve transcribing specialized and sensitive information.

What is needed is a system for providing a transcription service that is easily accessible by anyone and provides fast, accurate, reliable and secure transcriptions. The transcription system should be quickly and easily accessible by anyone on an ad-hoc basis, and it should be highly scalable such that transcription can occur almost instantaneously.

SUMMARY OF THE INVENTION

The present invention provides a system and method for providing a transcription service over a network. In one embodiment, the transcription service includes a transcription server, a database, and several communication gateways. In operation, a transcription request is received by the system. The request may be transmitted by anyone and includes audio data transmitted from an audio source. The request is analyzed and processed by the transcription server. In one embodiment, audio file processing includes segmenting the file and disguising the voice for security purposes before the audio file is sent to transcribers. The audio file is then sent to at least one transcriber for transcription.

While anyone may register with the system to perform transcription services over a network, transcriber performance, quality and service levels are monitored and managed by the system. Transcribers receive an audio file over the network from the transcription server, transcribe the file, and send the transcription back to the transcription server. The transcription server may then process the file and send the transcription to the entity that requested the transcription. Transcription accuracy may be validated statistically by the system, thereby enabling reliable transcription from unknown transcription nodes. In one embodiment, profiles may be configured for transcribers and transcription requesters. A rating may be maintained for a transcriber. The rating may consist of an accuracy rating and a speed rating.

DETAILED DESCRIPTION

The present invention provides a system and method for providing a transcription service over a network. In one embodiment, the transcription service includes a transcription server, a database, and several communication gateways. In operation, a transcription request is received by the system. The request may be transmitted by anyone and includes audio data transmitted from an audio source. The request is analyzed and processed by the transcription server. In one embodiment, audio file processing includes segmenting the file and disguising the voice for security purposes before the audio file is sent to transcribers. The audio file is then sent to at least one transcriber for transcription. Transcriber performance, quality and service levels are monitored and managed by the system. Transcribers receive an audio file over the network from the transcription server, transcribe the file, and send the transcription back to the transcription server. The transcription server may then process the file and send the transcription to the entity that requested the transcription. Transcription accuracy may be validated statistically by the system, thereby enabling reliable transcription from unknown transcription nodes. In one embodiment, profiles may be configured for transcribers and transcription requesters. A rating consisting of an accuracy rating and a speed rating may be maintained for each transcriber.

Figure 1:
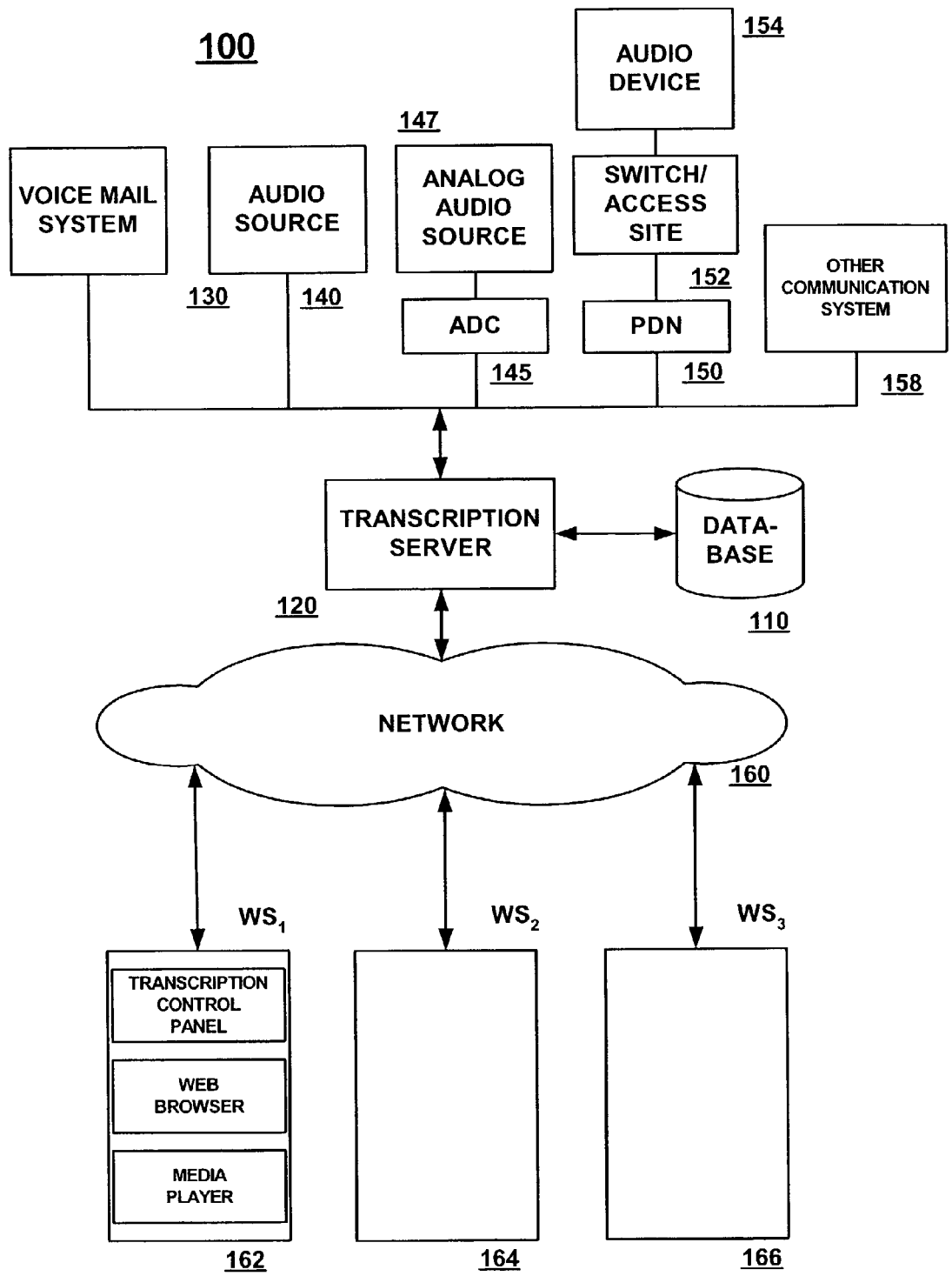
FIG. 1 is an illustration of a system for providing a transcription service in accordance with one embodiment of the present invention.

A system 100 for providing a transcription service over a network in accordance with one embodiment of the invention is illustrated in FIG. 1. System 100 includes database 110, transcription server 120, voice mail system 130, audio source 140, analog to digital converter (ADC) 145, analog audio source 147, packet data network (PDN) 150, switch/ access site 152, audio device 154, other communications system 158, network 160 and user workstations 162, 164 and 166.

Database 110 receives, stores, and transmits transcription system information. In the embodiment shown in FIG. 1, the database 110 transmits and receives information with transcription server 120. The information may include audio data or audio data segments to be transcribed, supplementary audio file information, transcriptions of audio data or audio segments, transcriber information, requestor information, transcription request information, billing information, transcriber rating and payment information, and other transcription service information.

In the embodiment shown, transcription server 120 may receive digital audio data and streams from voice mail system 130, audio source 140, and packet data network 150. Analog audio source 147 may be any system from which an analog audio stream may be retrieved and provided to transcription server 120. In one embodiment, upon receiving an analog audio stream such as dictation received over public switched telephone network (PSTN) lines, an ADC 145 generates a digital version of the analog audio stream. The ADC may be internal or external to transcription server 120. The digital version of the audio stream would then be used for further processing in the transcription server 120. Transcription server 120 may also receive a voice mail, electronic mail containing digital audio data, or another type of audio data or stream to be transcribed from audio source 140. Examples of other audio files and streams provided by audio source 140 include audio tracks to recorded meetings, broadcasts, or other events having audio that can be transcribed.

Transcription server 120 may receive audio data or an audio stream from an audio device 154 through PDN 150. The audio device may be a telephone, cellular phone, personal digital assistant (PDA), computer or other device 154 configured to transmit audio data or an audio stream. In one embodiment, the audio device may transmit an audio signal through a public telephone network or other network. The other networks may be a LAN or WAN, such as the Internet. The signal is then received by switch or access site 152 and sent over PDN 150 to transcription server 120.

The transcription server may transmit and receive information with workstations 162–166 over network 160. As shown in FIG. 1, the transcription service system may work with any number N of workstations. The workstations may consist of a processor, a memory, a monitor, a speaker device, an input device, and a means for establishing a connection to a network. The monitors may also include a media player for playing audio associated with a file to be transcribed. In one embodiment, the workstations 162–166 may initiate the establishment of a connection with transcription server 120. Once a connection is established, information may be transmitted between the particular user workstation and the transcription server. In one embodiment, the network 160 is the Internet. In this case, workstations may include a web browser and transcription control panel as shown by workstation 162, and workstations may optionally include third party transcription applications. Using the web browser, the workstations 162–166 may access the transcription server through a web page hosted by the transcription server.

Figure 2:
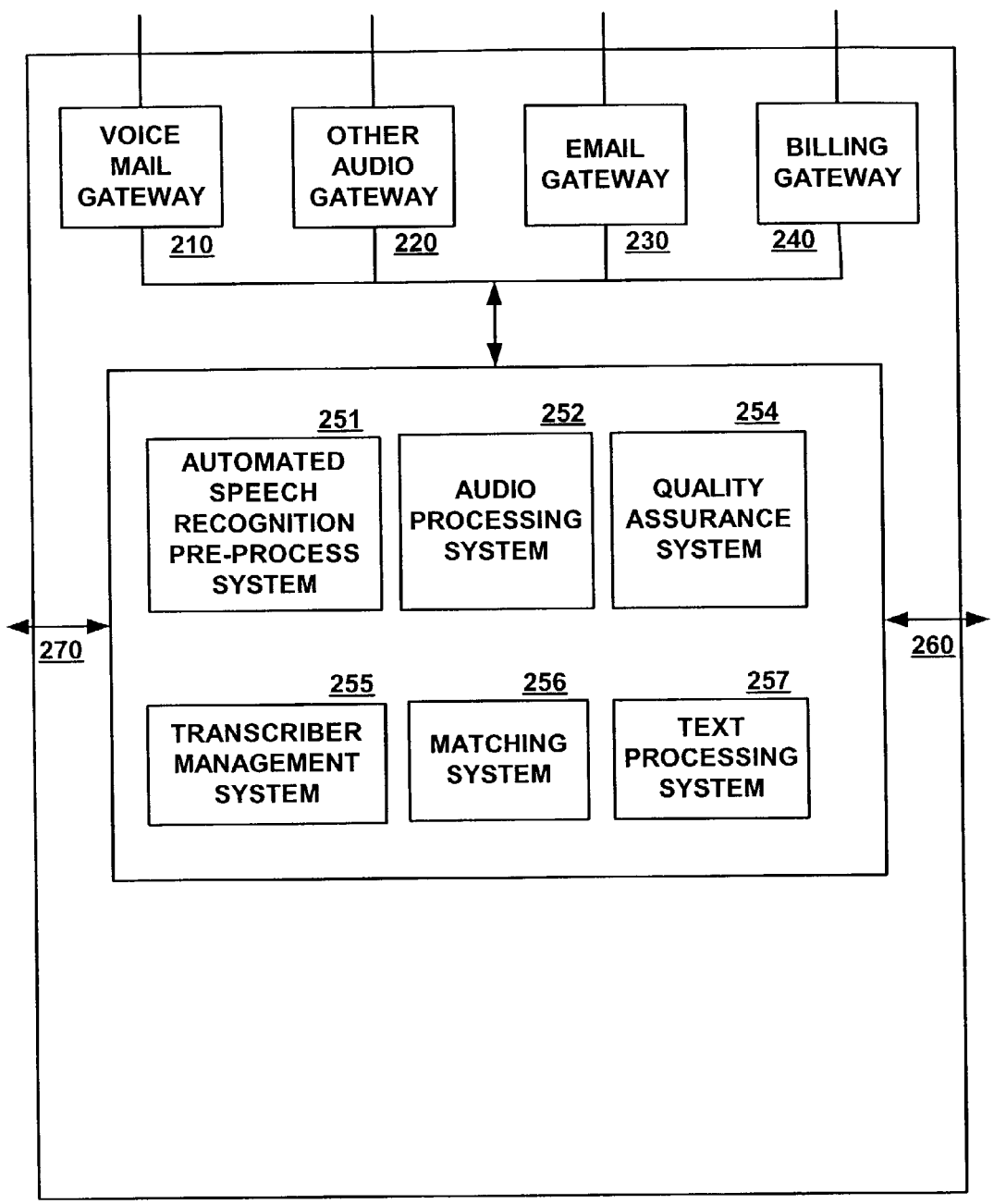
FIG. 2 is an illustration of a transcription server in accordance with one embodiment of the present invention.

Transcription server 120 in accordance with one embodiment of the present invention is illustrated in FIG. 2. The transcription server may be implemented as hardware, software or a combination of both. Transcription server 120 includes voice mail gateway 210, other audio gateway 220, electronic mail gateway 230, billing gateway 240, processing block 250, communication line 260 and communication line 270. Voice mail gateway 210 receives digital voice mails from voice mail system 130. Audio gateway 220 may be used to receive audio files from other sources such as audio source 140, analog audio source 147 or PDN 150. Electronic mail gateway 230 may be used to send electronic mail to transcribers, requesters, or other entities as well as receive electronic mail. Billing gateway 240 may be used to send and receive billing information to and from local or remote billing systems. In one embodiment, the billing information may be sent to a utility company, a service provider, the transcription requestor's employer, the transcription requester, or some other entity as needed for a particular application. For example, if a transcription requestor received billing invoices through a telephone company for using the transcription services of the present invention, information regarding the requestor's transcription services received would be transmitted to the telephone company through billing gateway 240. Files, data, and other information received by gateways 210–240 are routed to processing block 250. Information to be transmitted from gateways 210–240 is sent from processing block 250.

In the embodiment shown, processing block 250 includes automated speech recognition pre-process system 251, audio processing system 252, quality assurance system 254, transcriber management system 255, matching system 256, and text processing system 257. These systems and their functions are discussed in more detail below.

In one embodiment, automated speech recognition pre-process system 251 handles word recognition or word spotting tasks. Word recognition can be used to filter out key words. For example, speech recognition techniques can be used to recognize a series of digits that may represent phone numbers, or key words such as days or months and the words around them that may resemble an important date or meeting time. Word spotting may be used to search for key words at any location in an audio file, or at a predetermined location, such as the last twenty seconds. Once recognized, the key words may be stored in memory. In one embodiment, the key words may be written to a file associated with the audio data received and returned to the requestor with the transcription. In addition, when portions of the file are recognized using these spotting techniques, they do not need to be passed to the rest of the system for processing.

Automated speech recognition pre-process system 251 may also recognize and track multiple speakers contributing to an audio file or stream. This is known as speaker identification and it is well known in the art. Speaker identification determines which registered speaker provides a given utterance from among a set of speakers. This is a text-independent process which allows for identification of the speaker using analysis of an unconstrained utterance. In one embodiment, the process for identifying a speaker begins with each speaker associated with the event for which the audio input will be transcribed providing a speech sample.

In one embodiment, a speech sample is not provided in advance of the audio input, and the speaker identification system contained in automated speech recognition pre-process system 251 must derive the unique speech wave patterns for each speaker from the audio provided. For example, in the case of a conference call, rather than taking the extra step of providing a sample in advance of the event, this sample can be derived from the introductory statement of each speaker as they enter the conference call. Alternatively, the conference call system may pass speaker identification information to the automated speech recognition system 251 if the systems have been integrated.

In another embodiment where a speech sample is not provided, the audio file may be routed to audio processing system 252 and the audio content may be optionally garbled, so that speakers may be identified but the substance and meaning of the audio content cannot be understood by the transcriber. The audio file is then routed to a transcriber using matching system 256. The transcriber then listens to the audio file while simultaneously viewing a graphical representation of the audio wave form. In one embodiment the transcriber uses functionality provided by the transcriber user interface to punch out a portion of the audio for each speaker and submits it to the automated speech recognition system 251 for the purpose of providing speech samples for speaker identification. A statistical technique is then used to build a speech model for each speaker, to which each speaker utterance will be matched. Upon each change in speaker, the system documents the change and time stamps the audio input of that speaker, so that portions of the completed transcription can be attributed to the appropriate speaker. Companies such as BBN Technologies, headquartered in Cambridge, Mass., companies in the Biometrics industry, as well as numerous academic institutions such as the Center for Spoken Language Understanding at the Oregon Graduate Institute have defined and developed systems for speaker identification which may be customized and utilized as part of the automated speech recognition pre-process system 251 in the present invention.

Figure 4:
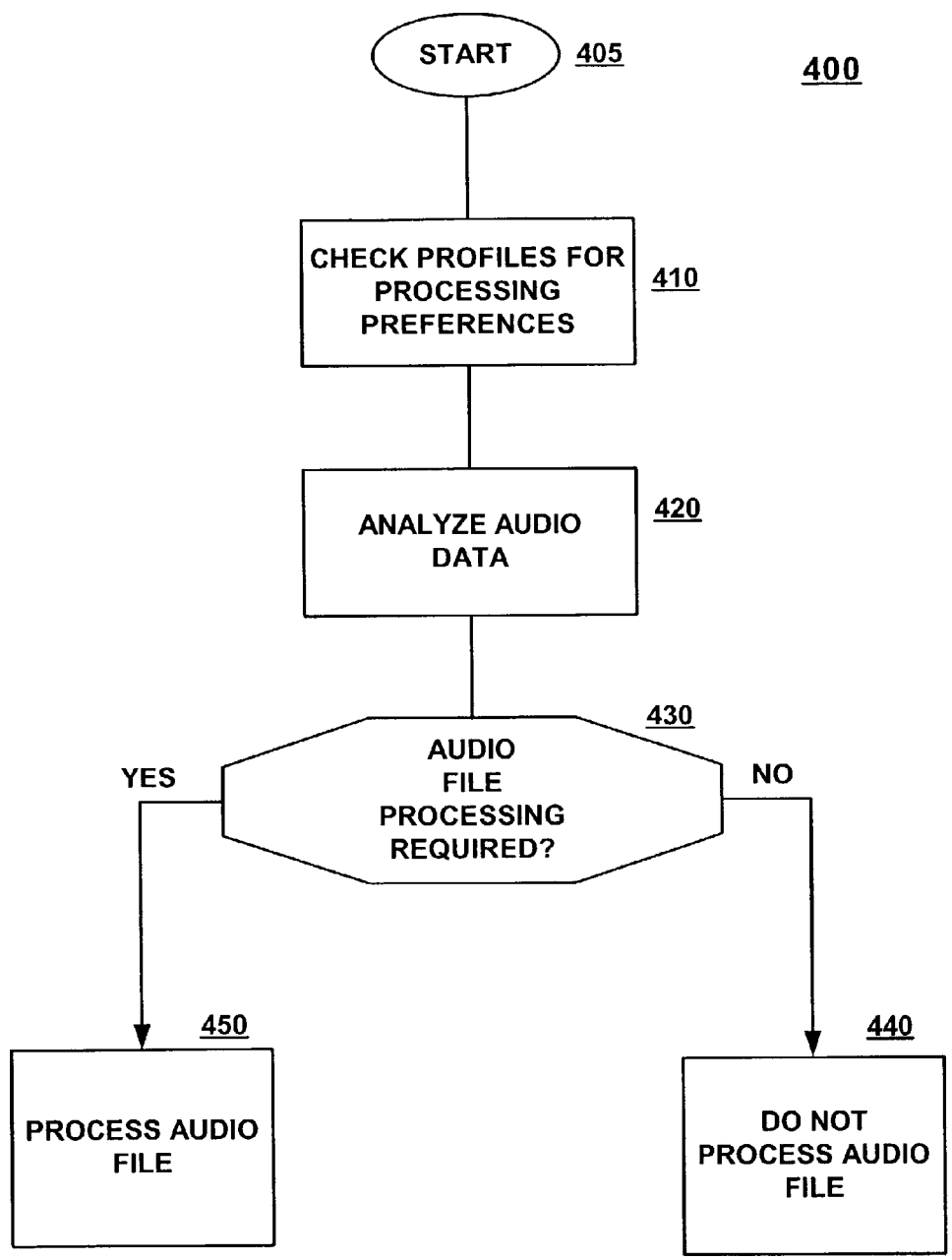
FIG. 4 is an illustration of a method for determining whether to process an audio file in accordance with one embodiment of the present invention.
Figure 5:
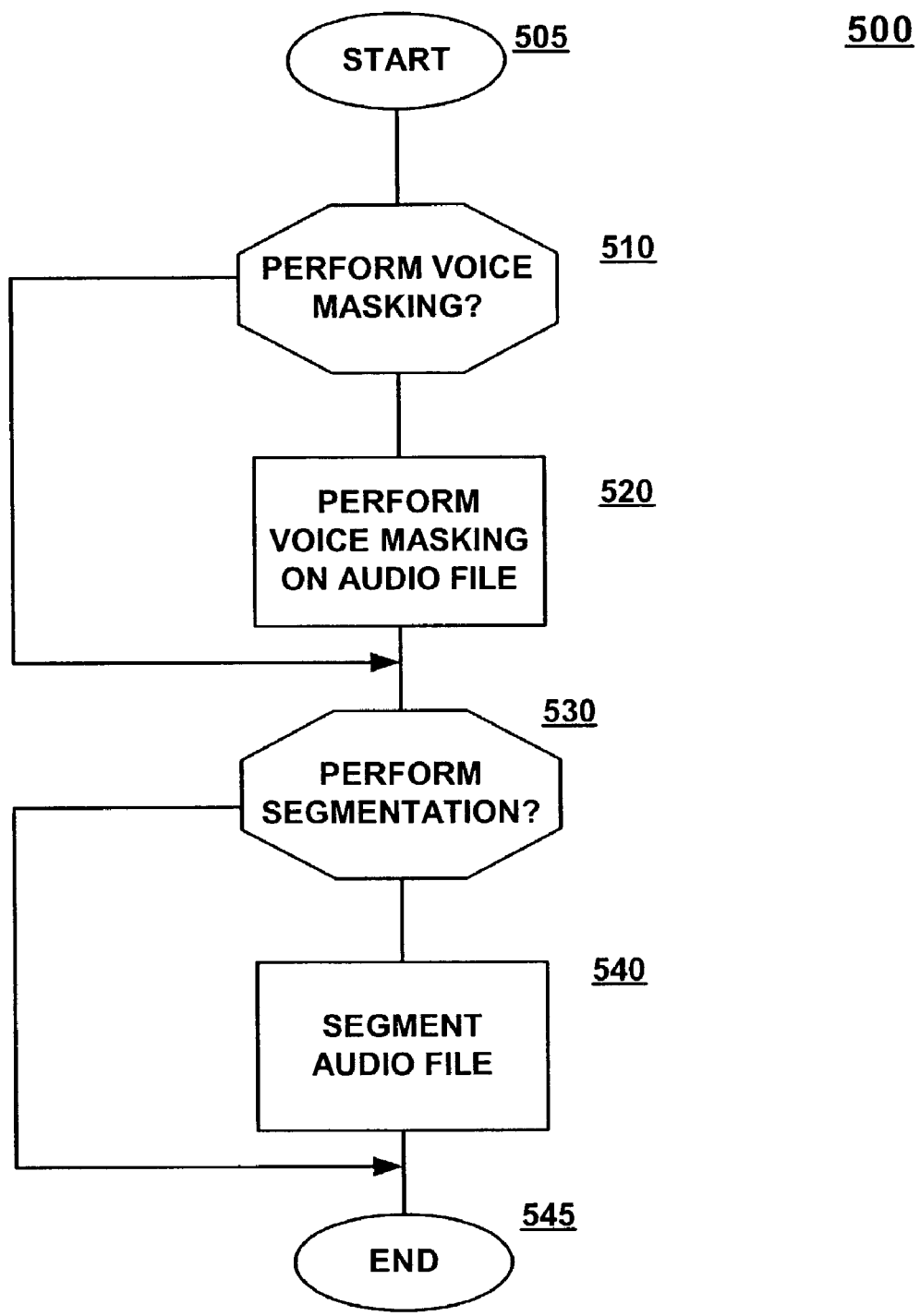
FIG. 5 is an illustration of a method for processing an audio file in accordance with one embodiment of the present invention.

The audio processing system 252 handles audio processing features such as segmentation and voice disguising, discussed in more detail below with respect to FIGS. 4 and 5. Both features may be performed according to preferences indicated in the requester profile or by the requester on a case-by-case basis. The quality assurance system 254 handles testing of transcribers and transcription disputes and is discussed in more detail below. The transcriber management system 255 handles the generation and maintenance of transcriber ratings, oversees transcriber performance, and instructs the system to take any action required with regard to transcriber performance management. Matching system 256 handles the process of matching a transcriber to a transcription request. Text processing system 257 reviews the completed transcription before returning it to the requester and may check the text of the transcription for elements such as profanity, spelling, grammar, and punctuation. At the option of the requester, common spelling and grammar errors may also be corrected by the text processing system.

Figure 3:
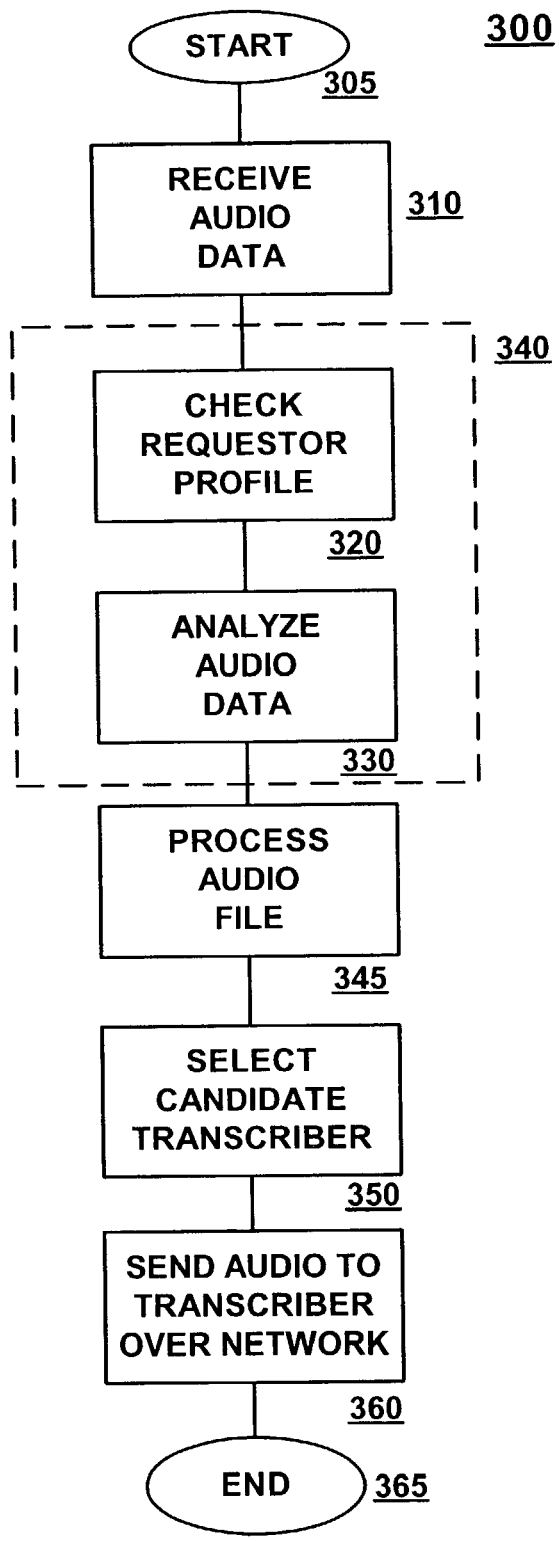
FIG. 3 is an illustration of a method for receiving a transcription request in accordance with one embodiment of the present invention.

A method 300 for receiving a transcription request in accordance with one embodiment of the present invention is shown in FIG. 3. Method 300 begins with start step 305. Next, audio data is received in step 310. The audio data received may be in the form of an audio file or an audio stream. The audio data received in step 310 may be received from a voice mail system, a mobile device, a telephone, an analog device such as a tape recorder, a personal digital assistant (PDA) type device configured to transmit audio data, cell phone or other device or system configured to transmit audio data. Audio data from a device may be received over a packet data network (PDN) or some other network. In one embodiment, a transmitted voice mail may be received through voice mail gateway 210 of FIG. 2. Audio data from sources other than a voice mail system may be received through an appropriate audio data gateway as represented by gateway 220 in FIG. 2. Once received, the audio data is retrievably stored in database 110.

In one embodiment, audio data or an audio stream received in step 310 includes an audio file. The audio file may be in any recognizable format, standard or proprietary, including mp3, wave file (.wav), G7.11, EVRC or other audio data format. The audio file may also be a video file with accompanying audio data that can be transcribed. Though the present invention will be described with respect to generating a transcription of an audio file, the invention is intended to work with audio using any type of medium or delivery system. Thus, every step and method described with reference to an audio file is intended to operate with an audio stream or other audio data in any medium or delivered by any system.

In one embodiment, supplemental audio file information may be received with the audio data in step 310. The supplemental audio file information may be received attached to or separate from the audio file itself. In one embodiment, the supplemental audio file information is received separate from the audio file as a descriptor that corresponds to the audio file. The supplemental audio file information may include audio file information, transcription information, and transcription requestor information. The audio file information may indicate the source, length, encoding and content of the file. Source information may indicate where the audio file was transmitted from, such as a voice mail system, an instant voice messaging system, a PDA, a telephone, or other device. In another embodiment, source information is determined by the gateway the file was received through. Length information may indicate the length of the audio file. The length of the file could be represented in time such as minutes or seconds, or memory such as the number of kilobytes or megabytes. Content information may include what language the audio is in or the subject matter of the content such as medical, legal, biology, or some other area.

The transcription information may include information pertinent to providing a transcription of the audio. In one embodiment, this may include the source of the transcription request, transcription security information, transcription urgency information, transcription billing information, transcription delivery information, and other information relating to the transcription request. Transcription requestor information may include requester identifying information, transcription requestor preferences for the audio file to be transcribed, any corporate or group transcription preferences applicable to the audio file, billing information, and other information about the requestor. The identifying information may be used to retrieve information regarding the requestor's billing, contact, and transcription request information stored in database 110. In one embodiment, the supplemental audio file information received with the audio file in step 310 is stored in database 110 as a transcription instruction file.

In one embodiment, when both an audio file and supplementary audio file information are received, both are associated with or assigned a global unique identifier (GUID). The GUID allows the transcription server to keep track of which audio file is associated with which supplementary audio file information. In this embodiment, the audio file and supplementary audio file information may be received at different times. In another embodiment, the audio file and supplementary audio file information are received consecutively by the transcription server 120 and assigned unique identification information upon receipt.

Preference information may be submitted to the transcription server 120 by a server provided interface or a client device. In one embodiment, the server provided interface includes a web page provided by the transcription server. In this embodiment, a requester could provide input to provide information regarding transcription information and preferences. For example, a requestor's preference for having an audio file segmented, the voice disguised, and desired urgency in receiving a transcription could all be input to the web page. If submitted by a client device, the device may be configured to allow a user to input preferences and submit the preferences to the transcription server along with the audio file.

Next, a requester profile is accessed in step 320. The requestor profile specifies the default rules and preferences for how audio data should be handled within the transcription system, including the service levels to which transcription requests are subject. A requester profile can be configured to serve as default rules both for individual requesters and for groups of requesters, such as a corporation or a department within a company. As an example, a law firm utilizing the transcription service may pre-configure preferences to dictate that all voice mails received and generated by partners and associates should be routed to transcribers having legal experience, and those voice mails must be transcribed within six hours of receipt by the transcription system. In one embodiment, the source of the audio data dictates which preferences are applied. An individual requester within that corporate entity may or may not have certain permissions that allow him to override the default group profile if a particular voice mail is more urgent and must be transcribed within the hour. In one embodiment, a requester profile having information corresponding to a requestor's transcription preferences as well as contact and billing information is accessible by the transcription server 120 and stored on database 110.

Information accessed and retrieved from the requestor profile may also include security preferences, urgency information, billing information, and other transcription information. The security preference may indicate a level of segmentation and voice disguising to be performed on the received audio file. Once retrieved, the information may be stored in cache memory, a register, or other memory.

After step 320, the audio data and supplementary information received in step 310 is then analyzed in step 330. In one embodiment, the source of the file or the nature of the data may be used to determine the requester preferences for transcribing the audio data. For example, an instant voice message file may be associated with a higher urgency then a voicemail file. As another example, all transcription requests from a particular entity may always be routed to a particular set of transcribers having certain special skills. Preferences for transcription associated with an audio source may be set by pre-configuring profiles or may be specified on a case-by-case basis by a requestor. Thus, a requestor may specify that voicemail is more urgent than any other type of audio file and must therefore command the highest service level.

In one embodiment, step 320 and 330 can be part of a process 340 for determining processing instructions for the data file received as part of the audio data in step 310. The process may be controlled by audio processing system 252 or another system within processing block 250. A process for determining processing instructions in accordance with one embodiment of the present invention is illustrated in method 400 of FIG. 4.

Method 400 begins with start step 405. Next, the system checks for an existing individual profile or group profile to which the requester is subject in step 410. If such profiles are found, processing preferences are retrieved from them. The processing preferences may indicate whether or not the audio files from the requestor should be segmented, to what degree they should be segmented, and whether voice masking should be performed on the audio files. Processing preferences may also include the urgency with which the audio file should be transcribed, and whether any special transcriber skills are needed to fulfill the transcription request. Next, the audio data is analyzed in step 420 for any processing preferences included in the supplementary audio file information. The system then determines how processing should be performed on the audio file at step 430. In one embodiment, this includes building transcription instructions for the particular request. The transcription instructions may be stored in database 110 and updated with the requestor's pre-configured preferences from the requestor profile as well as the supplementary audio file information preferences. In one embodiment, the transcription instructions are only updated with requestor's pre-configured preferences regarding a particular feature when no preference regarding that feature is indicated in the supplementary audio file information. Thus, a preference taken from supplementary audio file information overrides a pre-configured preference expressed in the requestor profile. In another embodiment, a pre-configured group preference may override a supplemental audio file information preference if the requestor is part of the group associated with the group preference.

For example, a requestor A may belong to the ACME group. The ACME group may have a group profile that indicates the default for all transcription preferences for the ACME group. For example, the ACME group profile indicates that all audio files are to be transcribed within twenty four hours and transcribers with special medical transcription training may be optionally selected by the requestor to perform the transcription. Requestor A who is subject to the pre-configured preferences in the ACME group profile may also have an individual profile which indicates a preference for transcription within six hours. When Requestor A submits a transcription request from her office at ACME, she may indicate that this particular request does not need to be transcribed by medical transcriptionists. The result is that the ACME group preference for transcription within twenty four hours overrides Requestor A's individual preference for transcription within six hours, and the audio is transcribed by transcribers other than the medical transcription specialists. In one embodiment, when a group preference overrules a requestor preference regarding a feature of the transcription, the requester will be notified regarding the disagreement. Preferences indicated within the group profile may determine whether to proceed with the transcription according to the group profile or cancel the transcription request. At step 430, if the system determines the audio file should be processed, operation continues to step 450 and the audio fiel is processed at step 345 of method 300. If the system determines that the audio file should not be processed, then operation continues to setp 440 and no processing occurs at step 345.

The audio file may be processed at step 345 in method 300. In one embodiment, at step 345, the audio file may be processed by segmenting the audio file, disguising the voice on the audio file, or both. In another embodiment, either audio file segmentation or voice disguising or both may be done automatically. In yet another embodiment, the audio processing system 252 may determine whether to perform each processing task after accessing a transcription instruction file associated with the particular audio file. A method for processing the audio file in accordance with one embodiment of the present invention is illustrated by method 500 of FIG. 5. Method 500 begins with start step 505. Next, it is determined whether voice masking should be performed on the audio file. In one embodiment, a transcription instruction file is accessed to determine whether voice masking should be performed. If voice masking should be performed, then operation continues to step 520. If voice masking is not to be performed, then operation continues to step 530.

Voice masking is performed on the audio file in step 520. In one embodiment, audio files are processed to remove noise and other artifacts and then voices are masked in such a way as to make all speakers sound similar in frequency, pitch, and speed. Audio processing to disguise a voice may include altering the frequency or pitch associated with the voice in the audio file. This may be accomplished with audio frequency processing techniques known in the art. In one embodiment, segmentation, voice disguising, and other security and privacy processing of the audio file is performed by audio processing system 252 of FIG. 2. After voice masking is performed, operation continues to step 530.

At step 530, the system determines whether or not to segment the audio file. In one embodiment, a transcription instruction file is accessed to determine whether segmentation should be performed. If segmentation should be performed, then operation continues to step 540. If segmentation should not be performed, then operation continues to step 545.

At step 540, the audio file is segmented. Segmentation provides a security measure in that each segment of a segmented audio file is transmitted to a different transcriber, and no one transcriber has access to the entire audio file. Accordingly, no transcriber can determine the complete content of the audio file. In addition, because multiple transcribers can work on parts of the same audio file concurrently, segmentation of the audio data also allows for near instantaneous transcription of very large audio files to be performed. In one embodiment, the file is segmented at "white spaces" in the audio, or moments when the audio is generally quiet or experiences a reduction in amplitude. In another embodiment, the audio file is segmented according to a random or fixed interval. In either case, the segments may overlap to ensure that no material is lost in the segmentation. Each segment may be long enough to allow a transcriber to identify words or phrases but less than the entire length of the audio file, thereby making it more difficult for the transcriber to determine the entire meaning or scope for the audio file subject matter. In one embodiment, each segment is at least five seconds long. The length of a segment may be specified in and retrieved from a requester profile, a group profile, or with regard to a particular transcription request in the supplemental audio file information. The audio processing system can be configured such that the length of a segment can be specified as an exact amount, a "not greater than" amount, or within a desired range. After segmentation is performed in step 540, method 500 ends at end step 545. Returning to FIG. 3, after audio processing occurs in step 340, operation continues to step 350.

Candidate transcribers are then selected in step 350. Matching system 256 governs the selecting and matching of transcribers to audio files to be transcribed. In one embodiment, a best-fit algorithm is used to select and match transcribers. The best fit algorithm involves various parameters about the request, the available transcribers, and how the system is configured. In one embodiment, candidate transcribers are selected based on requestor and group preferences, transcriber availability, and transcriber profile information. Candidate transcribers may be selected from among a pool of transcribers. The pool of transcribers may include all transcribers currently logged into the transcription server. Alternatively, the pool of transcribers includes all transcribers registered with the transcription server.

In one embodiment, an audio file will have an urgency preference associated with it. The urgency information may be accessed from the supplementary audio file or transcriber instructions associated with an audio file. In this embodiment, if the urgency preference indicates that an audio file does not need to be transcribed within a certain period of time, the audio file will be removed from consideration for finding a matching transcriber until a later time. Current transcriber traffic and past transcriber traffic patterns may also be used to determine whether an audio file should be transcribed at a later time.

Figure 6:
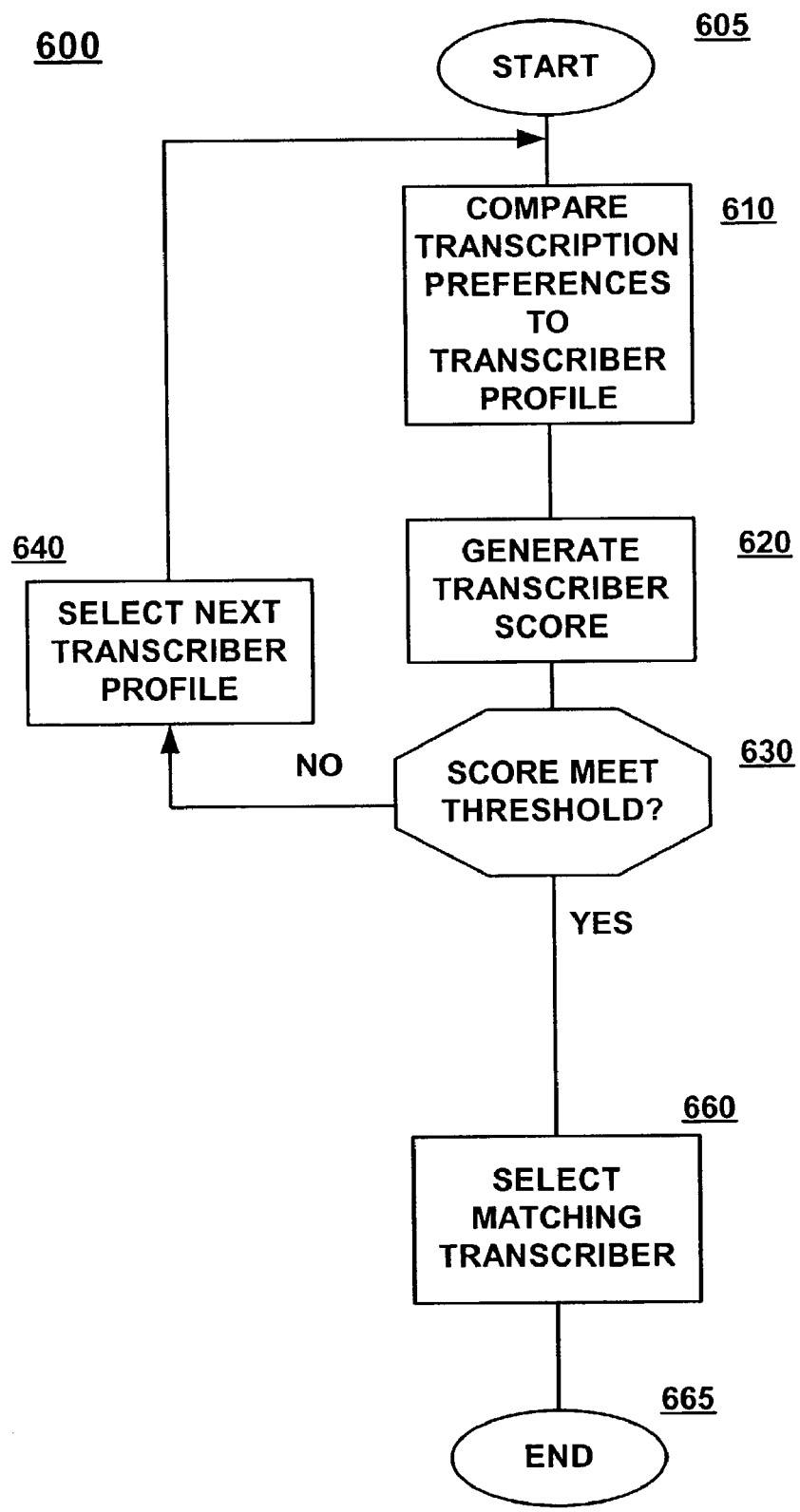
FIG. 6 is an illustration of a method for selecting a transcriber in accordance with one embodiment of the present invention.

A method for selecting a transcriber in accordance with one embodiment of the present invention is illustrated in method 600 of FIG. 6. In the embodiment shown, the transcribers are determined by comparing the transcriber profiles to a transcription instruction file associated with the audio file to be transcribed. The transcription instruction file may be generated or updated as illustrated in method 400 of FIG. 4. However, matching system 256 may determine a matching transcriber to a transcription request with or without a transcription instruction file as long as the system has access to the requestor profile and group profiles associated with the request, supplementary audio file information associated with the request, and transcriber profiles. Method 600 begins with start step 605. Next, the transcription preferences associated with the audio file are compared to a transcriber profile associated with a candidate transcriber in step 610. The transcription preferences may be taken from a transcription instruction file or otherwise accessed by matching system 256. In one embodiment, the transcription preferences and transcriber profile have several corresponding elements. These elements may include accuracy, speed, affiliation with a particular group, cost of transcription service, languages known, availability for transcribing, and reputation. Affiliation may include whether or not a transcriber is one of a select group of transcribers that a requestor prefers to send transcriptions to. Availability may include how long the transcriber will be available to the system to transcribe requests. Reputation may include the number of transcriptions performed by the transcriber or the length of time the transcriber has been associated with the service.

After the comparison is performed in step 610, the system determines a best-fit for the audio file among the transcribers. In one embodiment, the best fit algorithm begins with generating a score for a transcriber in step 620. In one embodiment, the score is the sum of several sub-scores derived from the matching performed in step 610. For example, a transcriber profile may match half the elements required by a transcription preferences associated with the transcription request. For each matched element, the transcriber may receive a positive sub-score. For each non-matched element, the transcriber may receive no sub-score. In another embodiment, the non-matched element may earn the transcriber a negative sub-score. This may be incorporated to effectively eliminate a particular transcriber from consideration if a particular preference or element is not met. The sub-scores from the matched and non-matched elements are totaled to derive a score for the transcriber.

The score generated in step 620 is compared to a threshold value in step 630. In one embodiment, the threshold value is designed to eliminate transcribers from consideration whose profile does not match a minimum number of transcription preferences or elements. The threshold may be set by the transcription server, the requestor profile, a group profile, or in some other manner. If the transcriber's score is less than the threshold, operation continues to step 640. At step 640, a different transcriber profile is selected for comparison and operation continues to step 610. In one embodiment, a transcription instruction file is updated with identifying information regarding the transcriber whose score was less than the threshold. With this information, the best-fit matching system can prevent the transcriber from being considered to transcribe the particular audio file or segments thereof again. If the transcriber score is equal to or greater than the threshold, operation continues to step 660.

In one embodiment of the present invention, steps 610 and 620 are repeated for a plurality or pool of several transcribers, such that a score is generated for each transcriber from the pool. The highest score from the pool of transcribers is then compared to the threshold in step 630. Then, assuming the highest score meets the threshold, operation continues with the transcriber associated with the highest determined to be the selected transcriber. Thus, in this embodiment, scores may be generated for a group of transcribers, and the transcribers may then be considered as a match in an order depending on their score rather than the order the scores are generated.

The matching transcriber is selected at step 660. In one embodiment, a transcription instruction file is updated to indicate that a transcriber has been selected to transcribe the audio file. Transcriber identification information may be written to the transcription instruction file as part of this process. Operation of method 600 then ends at step 665.

Returning to FIG. 3, once a transcriber is selected in step 350, the audio file to be transcribed is sent to the transcriber over network 160 in step 360. In one embodiment, the audio file is sent to a transcriber that is indicated in the transcription instruction file. In one embodiment, the audio file is normalized based on a selection made by the transcriber to make it easier for the transcriber to understand the speech. Examples of such normalization include adjusting the audio volume to a uniform level and adjusting the speech to a speed and pitch preferred by the transcriber.

In one embodiment, each audio file or segment is sent to more than one transcriber. In this embodiment, the transcription instruction file may indicate how many transcribers and to which transcribers the audio file is sent. When an audio file or segment is sent to more than one transcriber, the multiple transcriptions received may be used to generate transcriptions with high accuracy. For example, an audio file may be sent to three transcribers. Of the three transcriptions received in return, two may match and one may differ. In this case, the system will determine that the two matching transcriptions are the more accurate transcriptions and present that transcription back to the requester. After the audio file is sent to transcribers in step 360, operation ends in step 365.

In addition to human transcribers, automated transcribers may be used with the system of the present invention. The automated transcriber may perform transcription using speech recognition software or some other means. In one embodiment, the automated transcribers are treated similar to human transcribers in that they have a transcriber profile and rating subject to feedback on their performance history. The automated transcribers may be used to transcribe entire audio files or segments, or portions of audio files or segments such as key word searching performed by the automated speech recognition pre-processing system 251.

Figure 7:
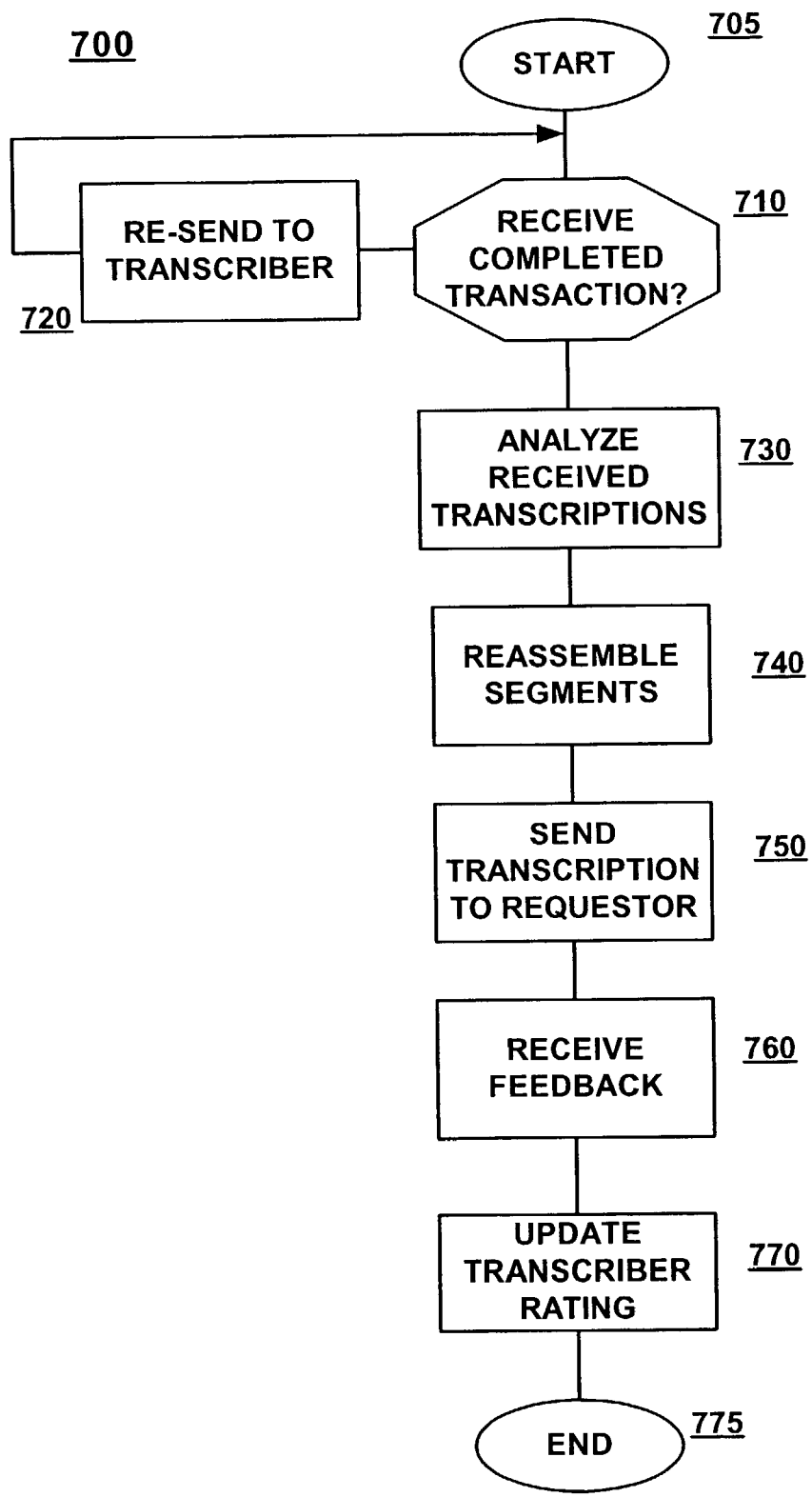
FIG. 7 is an illustration of a method for receiving a transcription in accordance with one embodiment of the present invention.

A method 700 for receiving transcriptions is illustrated in FIG. 7. Not all steps in method 700 are used for every embodiment. The inclusion of each step is determined based on the particular application. Method 700 begins with start step 705. Next, the system determines whether the transcription server in step 710 has received a completed transcription. If an audio file to be transcribed was segmented into multiple parts before being sent to transcribers in method 300, then transcription server 120 determines whether transcriptions of all segments that were sent to transcribers have been received at step 710. If the audio file was not segmented in method 300, then the transcription server determines whether the transcription of the audio file was received in step 710. In one embodiment, the transcription instruction file associated with the audio file indicates whether an audio file or audio file segments have been received back from transcribers. In one embodiment, determining whether or not a segment or audio file is received includes determining whether the segment or audio file is received within a certain time period. The time period may be based on the urgency or service level agreement associated with the particular transcription request.

In another embodiment, the time period is associated with the transcription turn-around time of a particular transcriber. Thus, if a transcription has not been received from a transcriber in the average time the transcriber usually provides a transcription, the transcription may be determined as failed. In one embodiment, the time for receiving the transcription may be extended by a margin to compensate for a late submittal or error margin. If the completed transcription has been received at step 710, operation continues to step 730. If the completed transcription has not been received, then operation continues to step 720. At step 720, transcription server 120 re-transmits any untranscribed segment or audio file to a new transcriber and operation returns to step 710. In one embodiment, the transcription instruction file indicates that the first transcription attempt failed and a new transcriber is being selected. A new transcriber is then selected according to method 600 of FIG. 6. In another embodiment, the transcription server determines that the node handling the un-transcribed segment is down in step 720 and re-directs the segment to a new candidate transcriber as determined in method 600 of FIG. 6.

Once the transcription is received, the transcription may be analyzed in step 730. Analyzing may include checking the quality of the transcription. In one embodiment, each segment or audio file may be sent to multiple transcribers. In this case, the multiple transcriptions are compared against each other and grouped to determine matches. The largest grouping of matches is determined to be the correct transcription. In another embodiment, the transcriber's transcription is compared to a pre-generated transcription that is known to be correct. This may be done to test the transcriber's accuracy before providing the transcriber with an audio file from an actual requester. Testing transcriptions are discussed in more detail with respect to transcriber management system 255 below. In another embodiment, the received transcription may be scanned for profanity or other language errors by text processing system 257. If profanity is detected in a transcription, the system may have the audio file transcribed by a second transcriber to confirm the contents are valid, or the system may instruct the quality assurance system 254 to issue test vectors to the transcriber associated with transcribing the profanity. If the profanity is determined to not originate from the audio file, the transcriber can be flagged for further review. In another embodiment, a requestor may indicate that no profanity should be transcribed. In this case, the transcribed profanity can be deleted or censored by the system.

Figure 8:
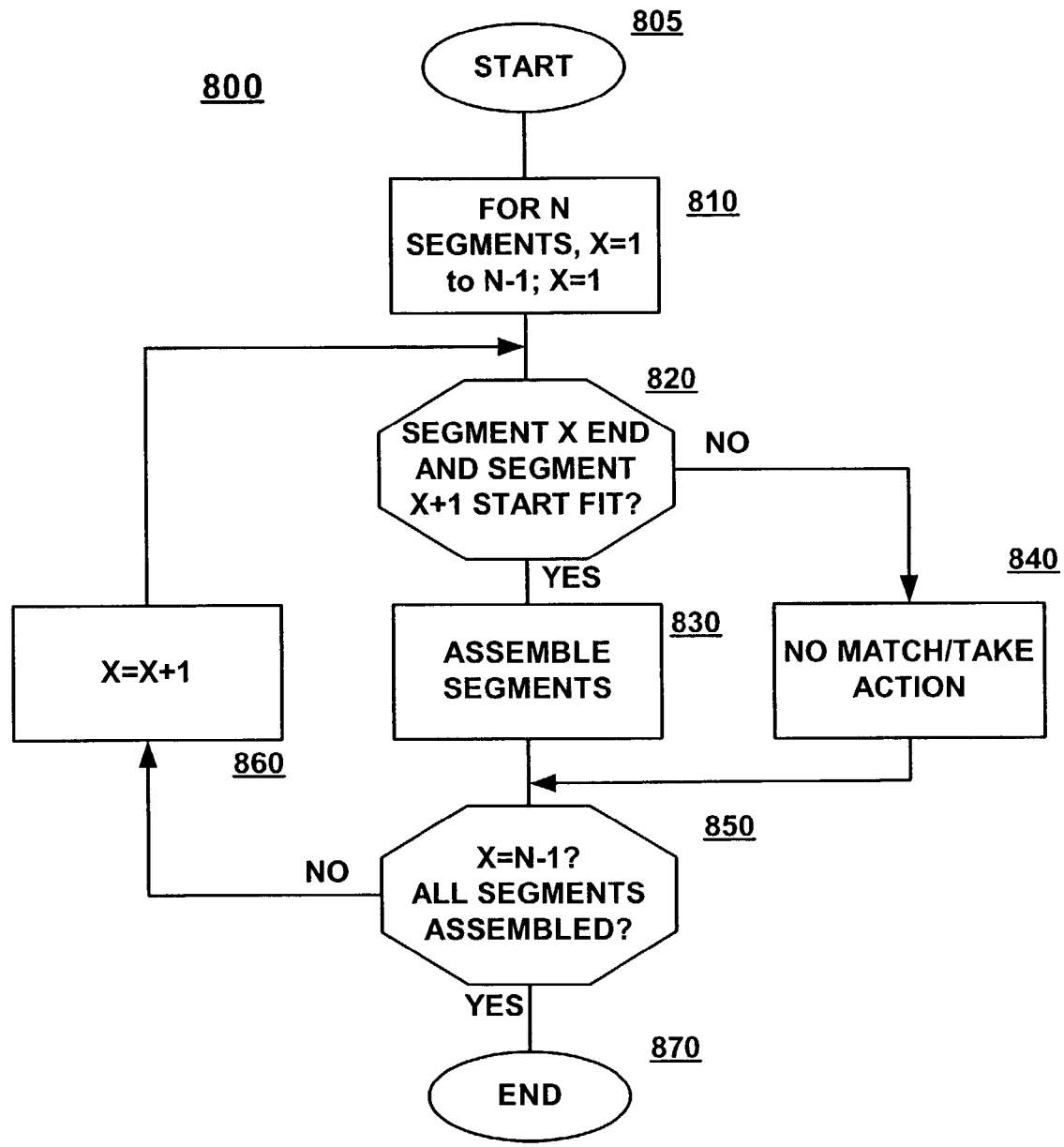
FIG. 8 is an illustration of a method for assembling received audio segments in accordance with one embodiment of the present invention.

Next, any necessary re-assembly is performed in step 740. If an audio file was divided into segments before transcription was performed, the segments are re-assembled before transmitting them back to a requester. In one embodiment, segments from a single audio file may be identified according to an identifier assigned to the audio file or audio file segments. The identifier could be a GUID or other unique identifier. The identifier may indicate the audio file the segments correspond to as well as the order the segments should be arranged. If the automated speech recognition system 251 determined that there were multiple speakers, the final transcription is formatted and labeled to indicate which portion of the transcription can be attributed to each speaker. One method for assembling audio file segments in accordance with the present invention is shown in method 800 of FIG. 8. Method 800 begins with start step 805. A logical loop consisting of steps 820 to 850 is used to assemble the segments corresponding to a particular audio file. The loop is repeated x=N−1 times, where N is the number of segments. In step 810, an initial value of one is assigned to x. Next, segment corresponding to x and x+1 are analyzed in step 820 to determine if they fit. In one embodiment, the content of each segment is determined such that consecutive segments overlap in content. Here, segments x and x+1 correspond to segments 1 and 2 respectively. Thus, the first two segments are analyzed to see if the end of segment one fits or matches the beginning of segment two. If the two consecutive segments match, then operation continues to step 830. If the segments do not match, then operation continues to step 840. In step 830, the segments are assembled using the matching content and operation continues to step 850.

In step 840, the transcription server determines that segments x and x+1 do not match and performs an appropriate action. In one embodiment, the transcription server continues with operation of method 800 and attempts to match the remainder of the segments. If the latter segment, segment x+1, does not match the next segment, segment x+2, then segment x+1 is determined to be a bad transcription and sent out to be transcribed by a new transcriber. If the remainder of the segments are determined to match, then either segment x, segment x+1, or both segments are sent out to be transcribed again. Alternatively, the segments that don't match may be attached at their endpoints with commentary that the audio file was segmented and the transcribed segments received did not match. The requestor may then provide feedback on the transcription and indicate which segment, if any, is incorrect. Transcriber ratings can then be updated accordingly. After step 840, operation continues to step 850.

In step 850, the transcription server determines whether more segments need to be assembled. If x=N−1, then no more segments need to be assembled and operation ends at step 870. If x is less than N−1, then more segments are to be assembled and operation continues to step 860. At step 860, x is incremented and operation continues to step 820 where the next segments are analyzed for assembly.

In another embodiment, each segment is assigned a time code upon segmentation. The segments can then be reassembled according to the time codes of the segments in the original audio file. Thus, a 15 second audio file could be segmented into 3 segments of 5 seconds each. The system would reassemble the three segments by time code, attaching the 0 through 5 segment to the 5 through 10 segment, and then attaching the 5 through 10 segment to the 10 through 15 segment. Alternatively, the segments may overlap and the time codes would be used to match the overlapping segments in order.

After any assembly performed in step 740, the entire transcribed audio file is then provided to the requesting entity in step 750. In one embodiment, the transcription is provided through email gateway 230. In another embodiment, the transcribed audio file is sent to the requestor via facsimile. In yet another embodiment, the transcription request is stored on the transcription server. In this case, the requestor is sent a notification signal that the transcription is available for viewing or retrieval from the transcription server. The notification could be transmitted to the requestor over a beeper, a phone, email, or other means. The requestor could then indicate a method to retrieve the transcriptions or access them through a web site.

A requestor may then provide feedback on a received transcription in step 760. Feedback operation may be governed and managed by quality assurance system 254 of the transcription server in FIG. 2. Feedback may (contain information regarding the speed and the accuracy of the transcription. For audio files segmented into several parts, a requestor may provide separate feedback on each part. In one embodiment, if a requestor does not provide feedback within a certain time period, the transcription will be assumed to be satisfactory. The time period may be set by the requester or group requesting the transcription or be set to a default value by the system. Once any feedback is received in step 760, a transcriber's rating is updated in step 770. In one embodiment, a rating may consist of an accuracy rating and a speed rating. In this case, the system measures the speed of the transcription and the requester rates the accuracy of the transcription. The transcriber rating may used to determine payment information for the transcriber. Thus, a transcriber with a higher rating would receive a higher level of compensation for transcription services rendered. Once a transcriber's rating is updated in step 770, operation ends in step 775.

Figure 9:
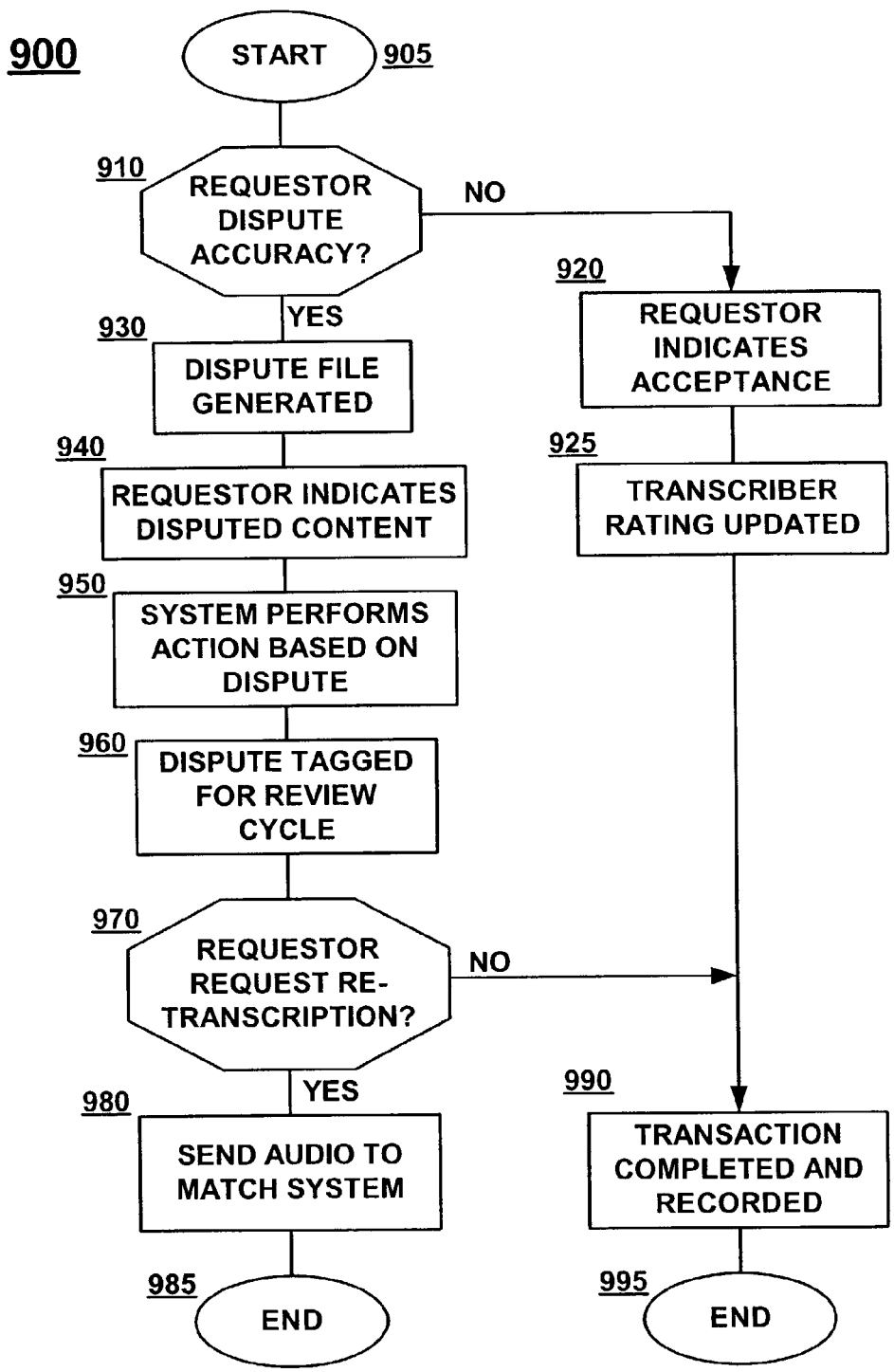
FIG. 9 is an illustration of a method for receiving feedback and updating a transcriber rating in accordance with one embodiment of the present invention.

In one embodiment, the feedback and rating performed in steps 760 and 770 is implemented as illustrated in method 900 of FIG. 9. Method 900 begins with start step 905. Once a requester receives a transcription, she may review the transcription for accuracy. The requestor may then indicate whether he or she chooses to dispute the accuracy of the transcription in step 910. If the requestor does not dispute the accuracy, then operation continues to step 920 where the system determines the requestor has indicated acceptance of the transcription. The profile of the transcriber who transcribed the audio file or segment is then updated in step 925 and process continues to step 990. If the requester chooses to dispute the accuracy of the transcription at step 910, operation continues to step 930 where a dispute file is generated by the quality assurance system 254. The requestor may then indicate what portions of the transcription are in dispute at step 940. In one embodiment, a requestor indicates these disputed portions by accessing a web page that displays the transcription text. The requestor may then select the portion of the text that the requester believes is incorrect. Next, the system performs an action based on the dispute in step 950. In one embodiment, the system determines which transcriber generated the disputed portions and updates their rating accordingly. If an audio file was segmented and the requestor disputes only one segment, only the transcriber who generated the disputed segment is affected by the dispute.

The dispute can then be tagged for a review cycle in step 960. In one embodiment, the review cycle involves transmitting the audio file and transcription to a trusted entity for investigation. The entity determines what happened, who is responsible, and any action to be taken. Examples of action to be taken as a result of the review cycle may include updating a transcriber rating or precluding a troublesome requester from using the transcription service. After updating the transcriber ratings accordingly, the requestor may then choose to have the audio file transcribed by a different transcriber in step 970. If the transcriber does not wish to have the audio file transcribed again, the transaction is completed and recorded in database 110 at step 990. Operation then ends at step 990. If the transcriber indicates the audio file should be transcribed again, the audio file is sent to matching system 256 to be transcribed. In one embodiment, the transcription instruction file associated with the audio file is updated at various steps in method 900 to indicate the processing of the audio file. For example, the transcription instruction file may indicate that the file is tagged for dispute at step 930 and the requestor requests a transcription of the audio file at step 980.

Transcriber rating, compensation, and other transcriber management functions are handled by the transcriber management system (TMS) 255 in FIG. 2. In one embodiment, the TMS maintains and monitors the transcriber rating for all transcribers registered with the transcription server. The TMS may take action regarding the transcriber upon the occurrence of a certain event that relates to the particular transcriber. The event may be a drop in the transcriber's rating or a failure to deliver other pre-defined service levels. The TMS may also take action if the transcriber fails to make himself available to the transcription system or fails to perform transcription services for some specified period of time. Conversely, the TMS may reward the transcriber for delivering transcription services that meet or exceed the required service levels.

The action taken by the TMS may include instructing the quality assurance system to send one or more test vectors to the transcriber to be transcribed. The transcriber does not know whether the system is sending test vectors or audio files from a requestor. When a transcription of the test vector is received from the transcriber, the transcription is compared to a correct version of the transcription. The transcriber's accuracy can be quickly determined from the correct copy of the transcription. Transcription of the test vector may serve the purpose of assessing the skills, speed, and accuracy of the transcriber, providing transcriber training within the transcription system or identifying a problem transcriber who should be prevented from further using the transcription system. For example, a test vector may be sent to all new transcribers to establish initial transcriber ratings. Test vectors may also be sent based on disputes and feedback from requesters, or they may be sent randomly to transcribers meeting a particular risk profile as a means of testing and making sure the transcribers are doing a high-quality job. The action may also include instructing the matching system to send an audio file for transcription to multiple transcribers for cross checking. This may be done when a transcriber has received a poor accuracy or speed rating. Thus, the same audio file is sent to multiple transcribers, including the transcriber with a poor rating. The resulting transcriptions of all the transcribers are compared or cross checked to determine the accuracy and speed of the transcriber having a low rating. In one embodiment, as a transcriber receives more unfavorable feedback and disputes, the TMS will instruct the system to send more test vectors or cross-check audio files to the transcriber.

Figure 10:
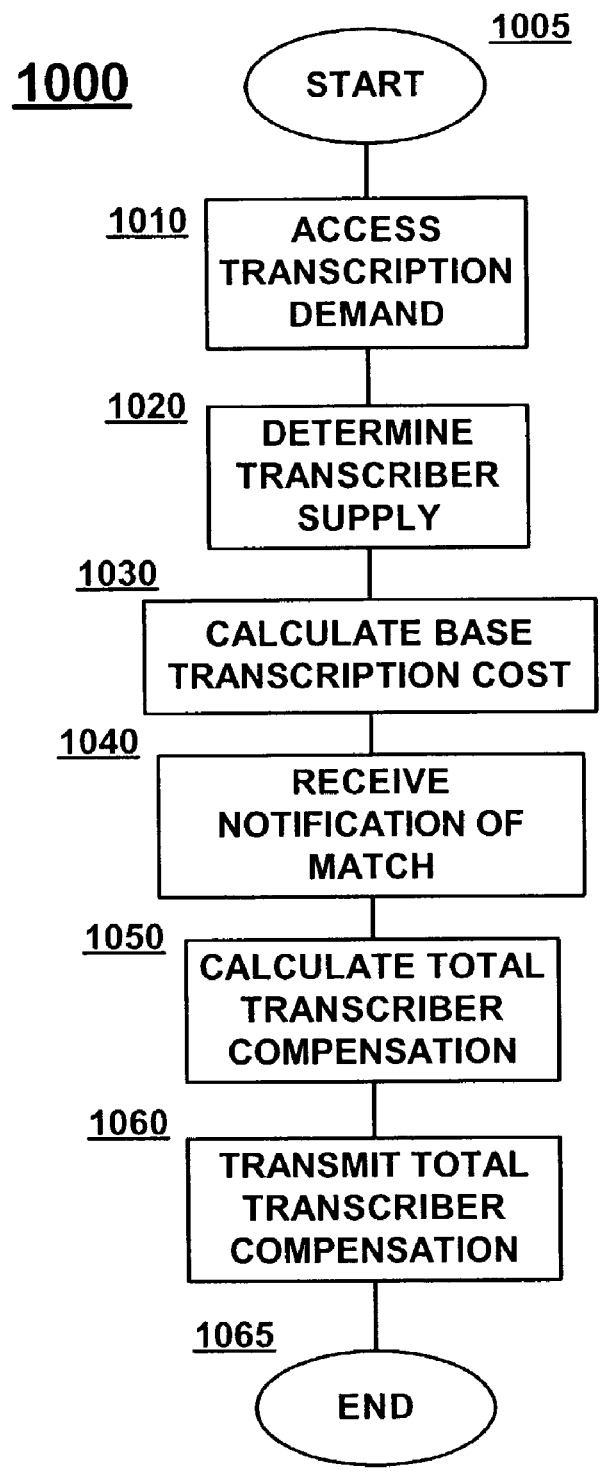
FIG. 10 is an illustration of a method for determining transcriber compensation in accordance with one embodiment of the present invention.

The TMS may also govern compensation for transcribers. In one embodiment, the transcriber's base compensation is determined based on the performance history of the transcriber as indicated by factors such as rating, speed, accuracy, availability history, experience with the transcription system and the amount of transcription work performed by a transcriber. The TMS may adjust compensation for a transcriber at any time based on performance and transcriber rating information. In another embodiment, the transcriber's base compensation is adjusted in real time based on several variables, which may include the demand for transcription services, the supply of available transcribers, the urgency with which transcription needs to be performed for one or more requests and any special skills required for transcription. A method 1000 illustrating this embodiment is illustrated in FIG. 10. Method 1000 begins with start step 1005. In step 1010, the TMS checks with matching system 256 to assess current demand for transcription. Next, TMS determines the number of available transcribers who are online and ready to transcribe in step 1020. In one embodiment, assessment of the transcribers or transcription requests could be performed by assessing the total number or the number having a particular characteristic. For example, the number of available transcribers could be assessed as the number of total transcribers currently logged in to the system or the number of transcribers logged in who understand spanish. In step 1030 the balance between supply and demand is determined, and the TMS calculates the base cost of a transcription for that point in time. Once a transcription is assigned to a transcriber by the matching system, the matching system 256 notifies the TMS in step 1040. Once a notification is received at step 1040, the TMS calculates the total transcription compensation in step 1050. In one embodiment, calculating the total transcription compensation includes factoring in the transcriber's base compensation level and any premiums that may be dictated by the urgency of the request or by special transcription skills required. In step 1060 the TMS transmits the total compensation for the transcriber to the matching system. The process then ends with end step 1065. In one embodiment, the matching system 256 sends the compensation information along with the transcription request to the transcriber. The compensation amount for each transcription request appears in the transcriber user interface so the transcriber can see how much they are being compensated for any given transcription activity.

In one embodiment, pricing can be determined based on transcriber performance and skills as well as on parameters that are dynamically tuned by the system. For example, the system may take into account transcriber behavior as transcription prices rise or fall. In this case, the system will seek to load balance the volume of requests for transcription with the number of available transcribers. If there are more transcribers than required to handle the load, the system will lower the price gradually until the load is balanced. If there are too few transcribers to handle the volume of transcription requests the system may send a notification by e-mail, pager of through the transcriber user interface to alert transcribers that prices are rising and transcription work is available in an effort to load balance the demand the transcription with the supple of transcribers.

Figure 11:
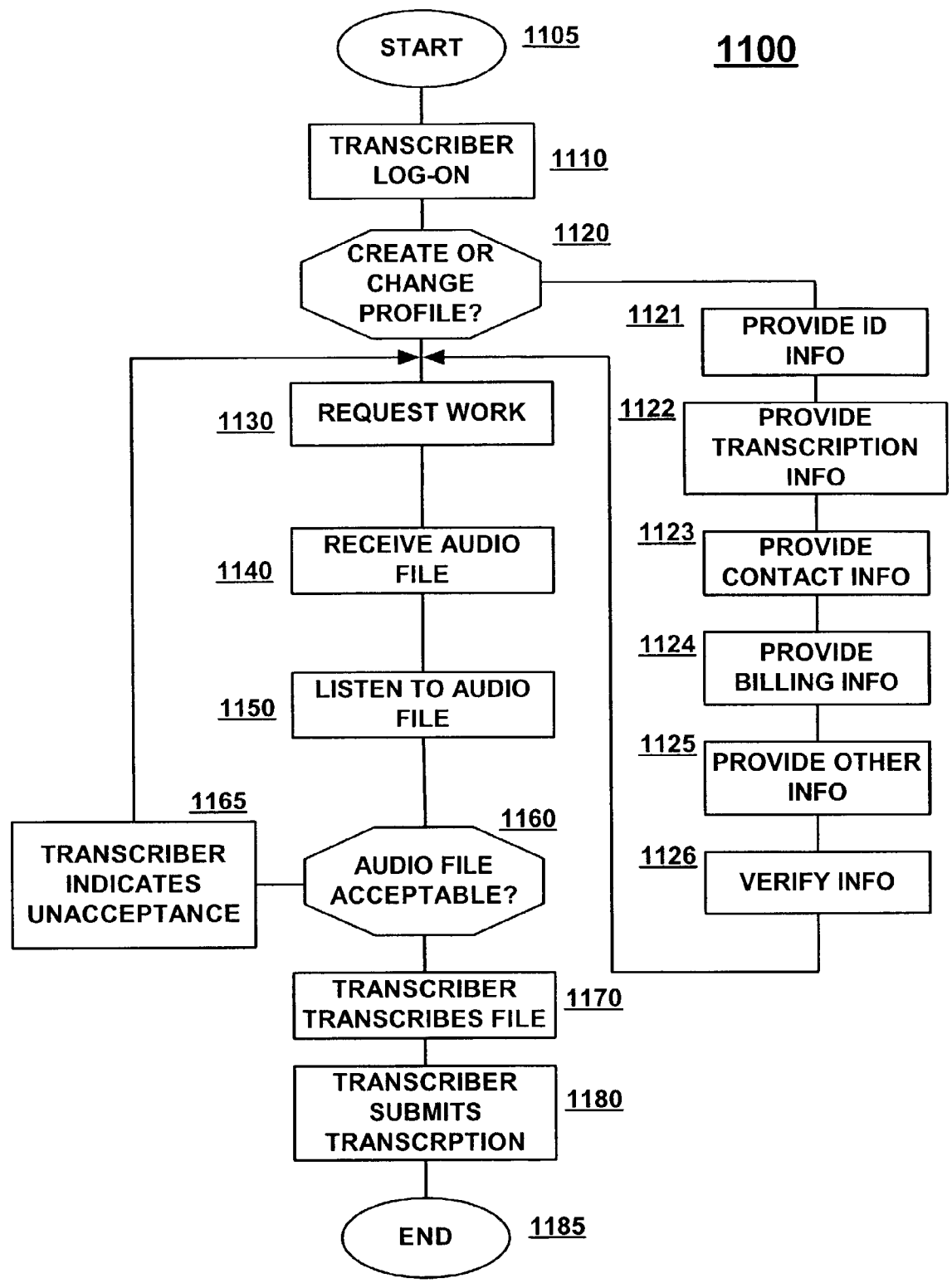
FIG. 11 is an illustration of a method for providing a transcriber in accordance with one embodiment of the present invention.

The transcription service of the present invention is intended to allow anyone with access to a workstation or computer to provide a transcription service. In one embodiment, a connection is established between a workstation such as one of workstations 162–166 and the transcription server 120. Upon establishment of the connection, the transcription server 120 may provide an interface to a user or transcriber at the workstation. The interface may be used by transcribers to register with the transcription service and perform transcription services. A method for performing a transcription in accordance with this embodiment of the present invention is illustrated in method 1100 of FIG. 11. Method 1100 begins with start step 1105. Next, a transcriber may login to the transcription service in step 1110. In one embodiment, login is performed after a connection between the transcription server and the transcriber workstation has been established. The login may require a transcriber to enter an identifier and a password. Once the transcriber has logged in, the system may determine whether or not the transcriber is registered with the system. In one embodiment, the transcription server 120 determines if the transcriber is registered by comparing transcriber login information to registered transcriber information in database 110. If the transcriber is registered with the system, then operation continues to step 1130. If the transcriber is not registered with the system, operation continues to a transcriber registration process. A registered transcriber may also choose to go through the registration process if the transcriber desires to change his or her profile information.

A registration process for a transcriber in accordance with one embodiment of the invention is illustrated by steps 1121–1126 of method 1100. The registering process illustrated is merely an example of a typical registration process, and is not intended to be the only possible method of registering a new transcriber in accordance with the present invention. Additional steps and information may be added to the registration process illustrated, and one or more of steps 1121–1126 could be eliminated.

The registration process in accordance with one embodiment of the present invention begins with step 1121 when identification information is received from a transcriber. Identification information may include name, desired login name, location information such as address information, and billing and payment information such as tax identification and address information. In one embodiment, a number and other information relating to a driver's license, passport, or credit card may also be received in step 1121. Transcribing information is received in step 1122. In one embodiment, the transcription information may include any subject matter the transcriber is familiar with, any certifications or licenses achieved by the transcriber, languages spoken and other information. In one embodiment, a transcriber may indicate proficiency with a subject matter with a scaled rating. Certifications and licenses may pertain to subject matter, languages, transcription, or other areas. Contact information may be provided by a transcriber in step 1123. In one embodiment, this may include email address information and other contact information such as phone number or facsimile number. In one embodiment, a company can register a number of transcribers and these transcribers can be managed through the system. For example, various management reports allowing the company to see the speed, accuracy, and other profile information of the transcribers under the company's umbrella can be viewed. Next, billing and payment information is provided in step 1124. Billing information may include payment address information, social security number or tax payer identification number, and other compensation related information. Other information can be collected in step 1125. Other information may include acceptance to a service agreement, name and password selection, and other information.

Once all information is entered, the registration information is transmitted to transcription server 120 and stored in database 110. In one embodiment, the registration information is stored as the transcriber profile information. A verification process may be performed in step 1126. In one embodiment, the system may email the transcriber at an email address provided by the transcriber. To continue with transcription services, the transcriber would be required to acknowledge receipt of the email. Other verification steps could be performed at step 1126, all considered within the scope of the present invention. Once the registration process is complete, operation continues to step 1130. In one embodiment, a user may update his or her registration information at any time he or she is logged into the transcription server.

At step 1130, a transcriber may request to perform a transcription. In one embodiment, the transcription server receives the transcriber request. The transcriber request indicates a readiness for the transcriber to perform a transcription. Once a request by a transcriber is received, the transcription server may determine if any transcription requests exist that match the transcriber profile. In another embodiment, a registered transcriber is designated as "available" upon login, and transcription requests received that match the transcriber profile may be routed to the transcriber. In any case, when the transcription server determines an audio file or segment is to be transcribed by the transcriber, the audio file or segment is transmitted to and received by the transcriber in step 1140.

After receiving the audio file in step 1140, the transcriber may listen to the audio file in step 1150. Then, the transcriber indicates whether the audio file is acceptable to the transcriber in step 1160. In one embodiment, the audio file may not be acceptable to a transcriber if the sound is distorted, incomplete, in a language not understood by the transcriber, clipped on one or both ends due to segmentation, or otherwise in such a condition as to prevent a transcriber from providing a proper transcription of the audio file. If a transcriber does not accept an audio file, the transcriber indicates this election in step 1165. In one embodiment, after selected as unacceptable, an audio file is tagged as such by the transcription server and sent back to the queue or requestor.

Also in step 1165, a transcriber may indicate the reasons an audio file is unacceptable. For example, if the audio file is not acceptable to the transcriber because the end is clipped due to segmentation, the system can re-segment the audio and send a larger or smaller portion to have it transcribed again, either by the same transcriber or a different one. If the transcriber indicates reasons why the audio file is unacceptable, she may receive compensation or positive feedback in some form. In one embodiment, this is to encourage transcribers to indicate the shortcomings of audio files or streams and reward transcribers for taking the time to listen to the audio file or stream and then take the appropriate action. Operation of method 1100 then continues to step 1130.

Upon accepting the audio file in step 1160, the transcriber may generate a transcription of the audio file in step 1170. In one embodiment, the audio file is provided to a transcriber through a user interface. The user interface may allow a transcriber to provide input to manipulate the audio file. The audio file manipulation input may correspond to commands such as "play", "pause", "fast forward" and "rewind" of the audio file. The user interface may also provide a window to allow a transcriber to enter text as the transcriber listens to the audio provided by the interface. Thus, in this embodiment, transcription would involve a transcriber typing text into a window of the user interface as the audio file is played for the transcriber. The transcriber can navigate the audio file as needed while typing the content of the audio file into the text window of the interface. In one embodiment, the loudness of the audio file or stream is normalized. Normalization can occur at any point from initial audio data receipt at step 310 to the sending the audio file at step 360 of method 300. In one embodiment, normalization occurs at audio file processing step 345. In addition the pitch and speed of the audio file playback can be automatically set based on the transcriber's preferences or through controls on the user interface.

The transcriber user interface may also display how much the transcriber is being paid, either on a time or per transcription basis. This payment amount can vary by the transcribers skill set, performance such as accuracy and speed, as well as time-of-day and system load. For example, if there are many more audio files to be transcribed than there are transcribers, the system may adjust payment terms higher so that transcribers are encouraged to transcribe more audio. If there are more transcribers than there are audio files, the system might reduce the price letting the transcribers know fewer of them are needed. In such a way, the system can optimize the overall speed and cost of the transcriptions. Once the transcriber has completed the transcription, the transcriber may submit the transcription at step 1180.

In one embodiment, a transcriber may call out selected content of the transcription. The called-out information can be provided to the requestor along with the transcription itself. The called-out information may include common data types such as date and time information, contact information such as name, email, or phone number, or other information. In one embodiment, the called-out information is populated into a user interface and presented to the user together with the transcription. Upon receipt, a requester may then save or transfer the called-out information into other applications such as calendar applications and electronic address book and contact lists. The format of the called out information may be a proprietary or any standard data format particular to the data type of the called-out information, such as vCard as specified in RFC 2425 and RFC 2426.

The completed transcription is transmitted to the transcription server when the transcriber provides input indicating the transcription is complete. In one embodiment, a transcriber may also provide billing information or other transcription specific information in step 1180. Alternatively, the system may retrieve transcriber billing information from the transcriber's profile stored in database 110. In one embodiment, the transcriber may choose to perform another transcription. In this case, operation continues to step 1130. Once the transcription is complete and transmitted and the transcriber does not wish to perform additional transcription, process ends at step 1085.

Figure 12:
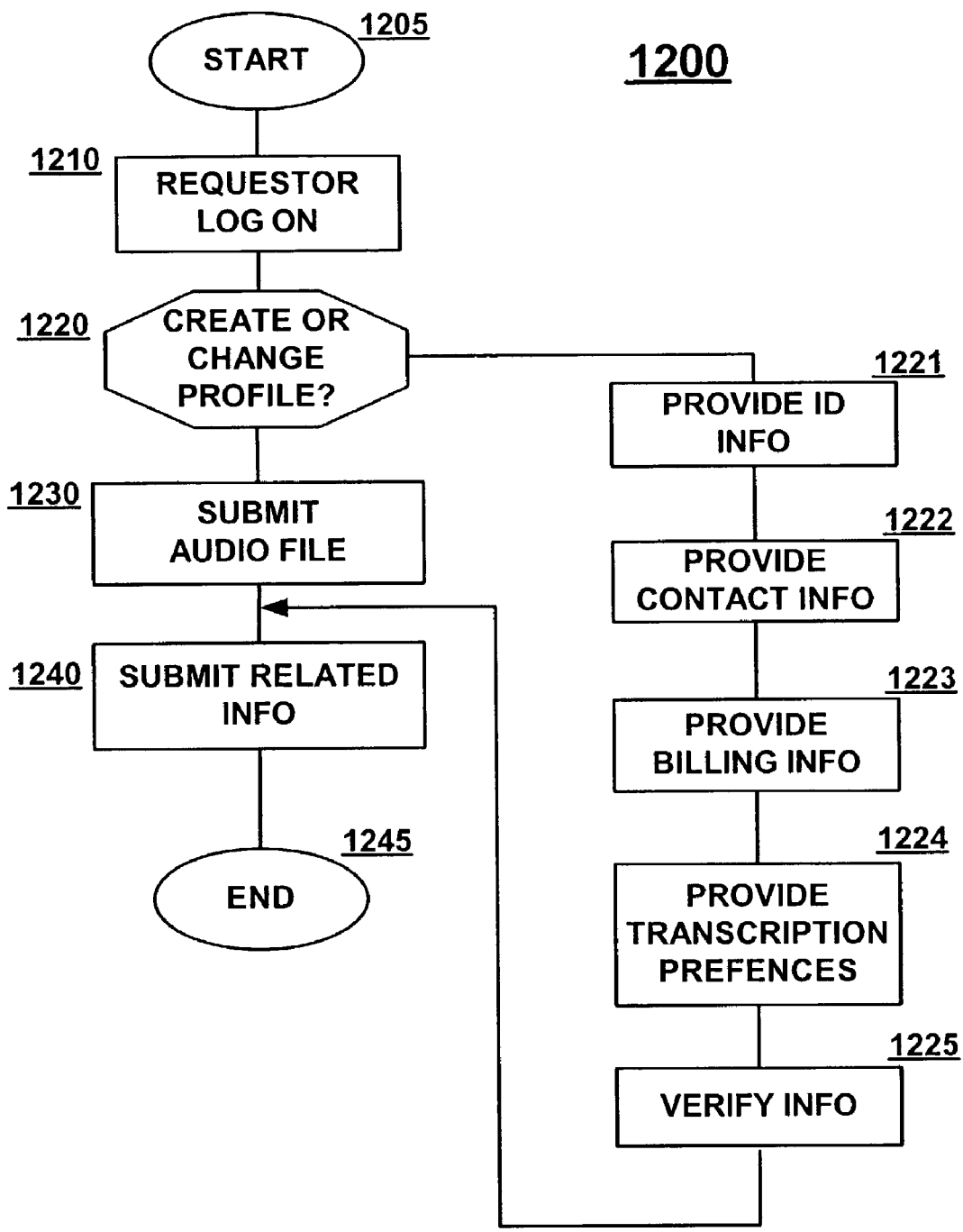
FIG. 12 is an illustration of a method for providing a transcription request in accordance with one embodiment of the present invention.

The transcription service of the present invention is intended to allow anyone with the capability to submit an audio file to receive transcription services. A method 1200 for requesting a transcription over a network in accordance with one embodiment of the present invention is shown in FIG. 12. Method 1200 begins with start step 1205. Next, a transcription requestor performs logon in step 1210. Once the requester has logged in, the system may determine whether or not the requester is registered with the system in step 1220. In one embodiment, the transcription server 120 determines if the requestor is registered by comparing requestor login information to registered requestor information in database 110. If the requestor is registered with the system, then operation continues to step 1230. If the requester is not registered with the system, operation continues to a requester registration process. A registered requestor may also choose to go through the registration process if the requestor desires to change his or her profile information.

A registration process for a transcription requestor in accordance with one embodiment of the invention is illustrated by steps 1221–1225. The registration process illustrated is merely an example of a typical registration process, and is not intended to be the only method of registering a new requester in accordance with the present invention. Additional steps and information may be added to the registration process illustrated, and one or more of steps 1221–1225 could be eliminated. Additionally, a similar registration process or some subset thereof may be used in conjunction with transcription services offered by a telecommunications company where transcription services are integrated with the voicemail system.

The registration process begins with step 1221 when identification information is received from a requester. Identification information may include name, login name, location information such as address information, and billing information such as credit card information. In one embodiment, an identification number and other information relating to a corporate identification, driver's license, passport, or credit card may be received in step 1221. Contact information is received from a requester in step 1222. In one embodiment, this may include email address information and other contact information such as phone number or facsimile number. Next, billing and payment information is received in step 1223. Billing information may include credit card information, billing account information, bill routing information, bank account information, and other payment related information. Next, transcription preferences and other related information is optionally provided in step 1224. Transcription information may include urgency preferences, security preferences, notification preferences, and other information. Urgency preferences may indicate the time by which a transcription request must be completed. Security preferences may indicate whether the audio file should be segmented, the voice in the audio file disguised, or both. Notification preferences may indicate whether the transcription requestor is to be notified and by what method and whether the transcription will be received by email, fax, mobile device, or in some other manner. Other information can also be collected in step 1224. Other information may include acceptance to a service agreement, name and password selection, and other information.

Once all information is entered, the registration information is transmitted to transcription server 120 and stored in database 110. In one embodiment, the registration information is stored as a requester profile for the requester. A verification process may be performed in step 1225. In one embodiment, the system may email the requester at a designated email address. To continue with transcription services, the requester would be required to acknowledge receipt of the email in some way. Other verification steps could be performed at step 1225, all considered within the scope of the present invention. Once the registration process is complete, operation continues to step 1230.

The requester may submit the audio file at step 1230. In one embodiment, the requestor may electronically submit the audio file through a user interface displayed on a workstation. The workstation may be connected to the transcription server over a network, similar to workstations 162-166. In another embodiment, the user may submit the audio file from a voice mail system, telephone, or other enabled device that is configured to provide audio to the transcription service system 100. In addition to providing the audio file, the user may optionally provide related transcription information in step 1240. The related information may include the subject matter of the transcription, urgency, security measures to be taken, billing information, notification information, or other transcription related information. Alternatively, related information may be retrieved from the requestor profile that is stored in database 110. Once the audio file and any related information is transmitted in step 1240, operation ends in step 1245. The requester then waits for the transcription request to be executed according to method 300 of FIG. 3, and to review the completed transcription according to method 900 of FIG. 9.

Figure 13:
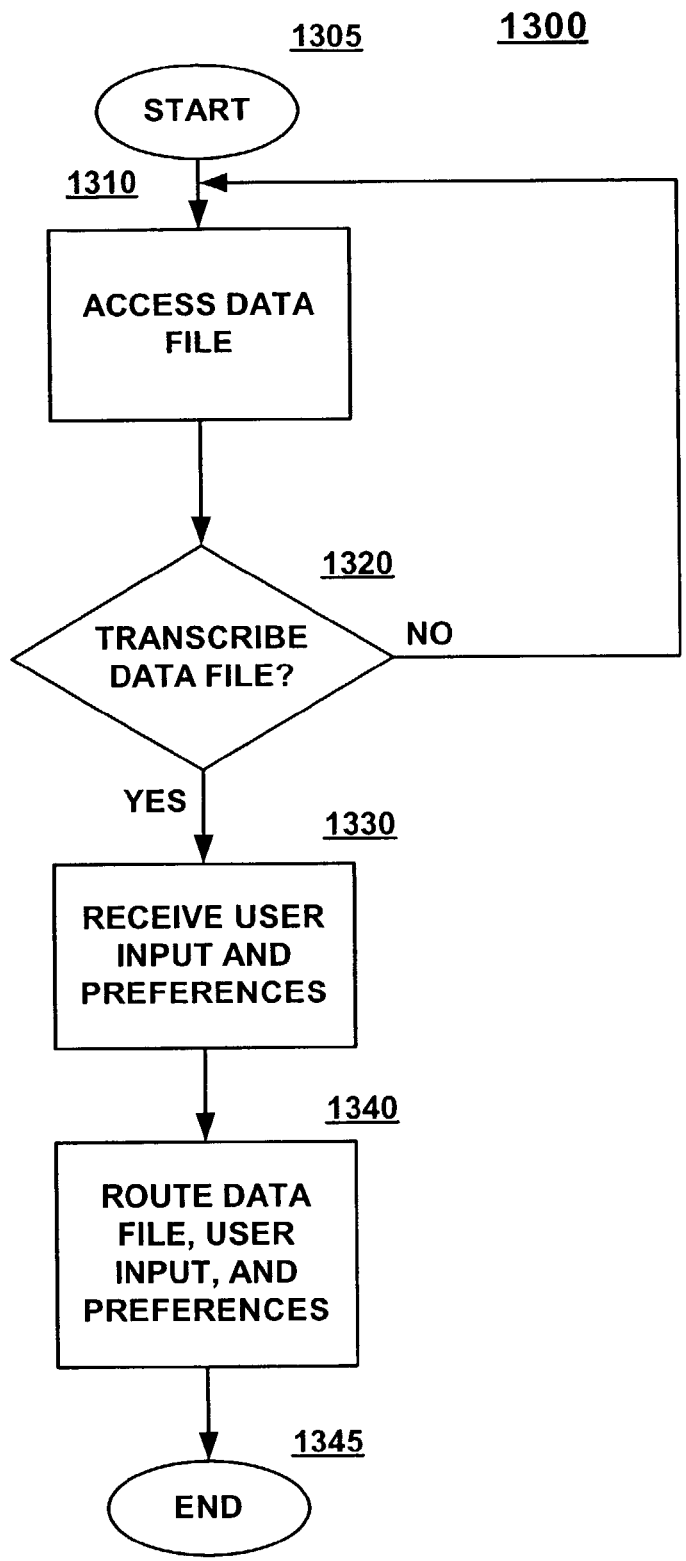
FIG. 13 is an illustration of a method for configuring and transmitting a data file to be transcribed in accordance with one embodiment of the present invention.

In another embodiment of the present invention, a company such as a telecommunications company may provide transcription services to users of its network and voicemail services, and the transcription services are integrated with its voicemail system. The process of requesting a transcription of an audio file through a voicemail system operated by a telecommunications company is described in method 1300 of FIG. 13. The process begins with start step 1305. In step 1310, the company provides access to a user to an audio file. In one embodiment, the data file is a voice mail file and accessed from a voicemail system. The audio file may be accessed by a voice activated or touch tone activated menu system, through a graphical user interface, or some other interface. In step 1320, the system determines whether or not to transcribe the date file. In one embodiment, the company system makes the determination at step 1320 by receiving input from a user indicating whether the accessed audio file should be transcribed. In one embodiment, the voicemail system prompts the user for input to indicate whether or not to transcribe the audio file. The user can accept or decline the transcription offer by depressing a key on the handset keypad, touch screen or the keypad of a stationary telephone. Alternatively, at any time during or immediately after hearing the audio file, the user may press a key on a keypad or touch screen or speak a command such as "forward for transcription" or similar words indicating the user's desire to transcribe the particular audio file. If the user does not wish to have the audio file transcribed, operation returns to step 1310. If the user wishes to have the audio file transcribed, operation continues to step 1330. In step 1330, the transcription requester may input transcription preferences and transcription requestor information by navigating through a menu system, either by depressing keys on a handset keypad, touch screen or on a stationary telephone keypad, or by speaking voice commands.

In one embodiment, transcription preferences may include transcription security preferences, transcription urgency preferences, transcription delivery preferences and any other instructions pertaining to transcribing the data file. Transcription requestor information may include requester identifying information such as a password or other identifier, billing information, and other information about the requestor. The identifying information may be used to retrieve information regarding the requestor's billing, contact, transcription request information and transcription delivery information which may already be stored in a database as part of that user's contact information with the company or the transcription service. In one embodiment, the requestor's existing electronic mail address contained in the requestor's contact information may be verified by the system and may be used for transcription delivery, or the system may prompt the requester to input a different electronic mail address or delivery option. In one embodiment, the requestor's existing billing account with the company may be billed for transcription services. Once transcription information and requestor information is received, the voice mail system routes the data file, user input and user preferences to be transcribed at step 1340. In one embodiment, the data file and any user input and preferences are routed to voicemail system gateway 210 of transcription server 120 illustrated in FIG. 2. In one embodiment, the transcription request preferences and other information are sent as supplemental audio file information. Operation then ends at step 1345.

The present invention provides a system and method for providing a transcription service over a network. In one embodiment, the transcription service includes a transcription server, a database, and several communication gateways. In operation, a transcription request is received by the system. The request may be transmitted by anyone and includes audio data transmitted from an audio source. The request is analyzed and processed by the transcription server. In one embodiment, audio file processing includes segmenting the file and disguising the voice for security purposes before the audio file is sent to transcribers. The audio file is then sent to at least one transcriber for transcription. Transcriber performance, quality and service levels are monitored and managed by the system. Transcribers receive an audio file over the network from the transcription server, transcribe the file, and send the transcription back to the transcription server. The transcription server may then process the file and send the transcription to the entity that requested the transcription. Transcription accuracy may be validated statistically by the system, thereby enabling reliable transcription from unknown transcription nodes. In one embodiment, profiles may be configured for transcribers and transcription requestors. A rating consisting of an accuracy rating and a speed rating may be maintained for each transcriber.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for providing a transcription service over a network comprising:
    receiving audio data from a requestor, at least a portion of the audio data to be transcribed by a transcriber;
    accessing a requestor profile associated with the requestor;
    selecting a transcriber to transcribe at least a portion of the audio data, the transcriber selected based on a transcriber profile associated with the transcriber and the requestor profile;
    transmitting at least a portion of the audio data to the transcriber over a network;
    receiving a transcription from a transcriber, the transcription corresponding to audio data provided by a requestor;
    transmitting the transcription to the requestor;
    receiving feedback from the requestor; and
    updating a transcriber rating associated with the transcriber who generated the transcription.

2. The method of claim 1 wherein receiving the audio data includes:
    receiving supplementary audio file information and an audio file, the supplementary audio file information corresponding to the audio file and stored in a database, the audio file to be transcribed by the selected transcriber.

3. The method of claim 2 wherein selecting a transcriber includes:
    comparing a transcriber profile to the transcription preferences to generate a score corresponding to the transcriber; and
    comparing the score to a threshold value.

4. The method of claim 2 wherein selecting a transcriber includes:
    comparing transcriber profiles for a plurality of candidate transcribers to the transcription preferences to generate a score for each of the plurality of candidate transcribers;

comparing each transcriber score to a threshold value; and selecting a transcriber from the plurality of transcribers, the selected transcriber having a score that is higher than the other transcribers and higher than the threshold.

5. The method of claim 1 further including:

segmenting the audio data into segments based on a transcription preferences corresponding to the audio data, wherein each segment is sent to a different transcriber over the network.

6. The method of claim 1 further including:

voice masking the audio data based on a transcription preferences corresponding to the audio data.

7. The method of claim 1 further including:

processing the audio data to identify each of a plurality of speakers, wherein processing includes receiving a speech sample corresponding to each speaker, the plurality of speech samples identified by and received from the selected transcriber.

8. The method of claim 1 further including:

processing the audio data to identify each of a plurality of speakers, wherein processing includes processing a speech sample corresponding to each speaker, the plurality of speech samples received from a requestor.

9. The method of claim 1 further comprising:

assembling received transcription segments, wherein the received transcription is one of the received transcription segments, the received transcription segments corresponding to audio data segments created from the audio data provided by the requestor, wherein transmitting the transcription includes transmitting a completely assembled transcription.

10. The method of claim 1 further comprising:

monitoring the transcriber rating corresponding to each transcriber within a transcriber pool, wherein monitoring includes:

determining whether an event occurs related to a transcriber; and if the event occurs, performing an action.

11. A method for providing a transcription service over a network comprising:

receiving audio data from a requestor, at least a portion of the audio data to be transcribed by a transcriber;

accessing a requestor profile associated with the requestor;

selecting a transcriber to transcribe at least a portion of the audio data, the transcriber selected based on a transcriber profile associated with the transcriber and the requestor profile; and transmitting at least a portion of the audio data to the transcriber over a network.

12. The method of claim 11 wherein the audio data includes voice mail data, the voice mail data to be transcribed by a selected transcriber.

13. The method of claim 11 wherein the audio data includes an electronic audio file attached to an electronic mail, the electronic mail attachment to be transcribed by a selected transcriber.

14. The method of claim 11 wherein receiving the audio data includes:

receiving supplementary audio file information and an audio file, the supplementary audio file information corresponding to the audio file and stored in a database, the audio file to be transcribed by the selected transcriber.

15. The method of claim 14 wherein selecting a transcriber includes:

comparing a transcriber profile to the transcription preferences to generate a score corresponding to the transcriber; and comparing the score to a threshold value.

16. The method of claim 14 wherein selecting a transcriber includes:

comparing transcriber profiles for a plurality of candidate transcribers to the transcription preferences to generate a score for each of the plurality of candidate transcribers;

comparing each transcriber score to a threshold value; and selecting a transcriber from the plurality of transcribers, the selected transcriber having a score that is higher than the other transcribers and higher than the threshold.

17. The method of claim 11 further including:

processing the audio data based on a transcription preferences corresponding to the audio data.

18. The method of claim 17 wherein processing includes segmenting the audio data into segments, wherein each segment is sent to a different transcriber over the network.

19. The method of claim 17 wherein processing includes voice masking the audio data.

20. The method of claim 11 further including:

processing the audio data to identify each of a plurality of speakers.

21. The method of claim 20 wherein processing the audio data to identify each speaker includes receiving a speech sample corresponding to each speaker, the plurality of speech samples identified by and received from the selected transcriber.

22. The method of claim 20 wherein processing the audio data to identify each speaker includes processing a speech sample corresponding to each speaker, the plurality of speech samples received from a requestor.

23. The method of claim 20 wherein processing the audio data to identify each speaker includes receiving speaker identities from an integrated conferencing system.

24. The method of claim 11 wherein the audio data includes conference calls.

25. The method of claim 11 wherein the audio data includes an audio track from video.

26. A method for providing a transcription service over a network comprising:

receiving a transcription from a transcriber, the transcription corresponding to audio data provided by a requestor;

transmitting the transcription to the requestor;

receiving feedback from the requestor; and updating a transcriber rating associated with the transcriber who generated the transcription.

27. The method of claim 26 wherein receiving the transcription includes:

receiving call out information from the transcriber, the call out information associated with the transcription received from the at least one transcriber.

28. The method of claim 26 wherein receiving a transcription includes:

determining whether the transcription has been received within a set period of time; and transmitting the audio file to an alternate transcriber if the transcription was not received within the set period of time.

29. The method of claim 26 further comprising:
assembling received transcription segments, wherein the received transcription is one of the received transcription segments, the received transcription segments corresponding to audio data segments created from the audio data provided by the requestor, wherein transmitting the transcription includes transmitting a completely assembled transcription.

30. The method of claim 26 wherein the transcriber rating includes an accuracy rating and a speed rating.

31. The method of claim 26 further comprising:
monitoring the transcriber rating corresponding to each transcriber within a transcriber pool, wherein monitoring includes:
determining whether an event occurs related to a transcriber; and
if the event occurs, performing an action.

32. The method of claim 31 wherein the event includes the transcriber's rating dropping below a threshold level.

33. The method of claim 31 wherein the event includes a transcriber's failure to perform transcription services.

34. The method of claim 31 wherein the action includes sending a test vector to the transcriber associated with the event.

35. The method of claim 31 wherein the action includes sending an audio file to be transcribed to several transcribers, the several transcribers including the transcriber associated with the event, the transcription received from each of the several transcribers compared to cross-check the transcription received from the transcriber associated with the event.

36. The method of claim 26 further comprising:
transmitting billing information through a gateway, the billing information including information from which the cost of transcription services may be derived.

37. The method of claim 26 further comprising:
analyzing the received transcription for profanity content.

38. The method of claim 26 further comprising:
formatting the received transcription to include speaker identity labels.

39. A method for providing a transcription service over a network comprising:
identifying a transcriber located at a workstation, the transcriber associated with a transcriber profile and a transcriber rating, the profile and rating stored in the database;
receiving a work request input initiated by the transcriber, the work request input indicating the transcriber is requesting transcription work;
routing an audio file to the transcriber, the audio file associated with a transcription preferences, the transcriber profile determined to have matched the transcription preferences;
receiving a transcription of the audio file from the transcriber; and
updating the transcriber rating based upon the transcription received.

40. The method as claimed in claim 39 further comprising:
receiving transcriber information from the transcriber, the transcriber information stored in the transcriber profile.

41. The method as claimed in claim 39 further comprising:
receiving tag call out information from the transcriber.

42. The method of claim 40 wherein receiving tag call out information includes:
retrievably attaching the call-out information to the transcription in a format compatible with an electronic mail application.

43. The method of claim 40 wherein receiving tag call out information includes:
retrievably attaching the call-out information to the transcription in a format compatible with an electronic calendar application.

44. The method of claim 40 wherein receiving tag call out information includes:
retrievably attaching the call-out information to the transcription in a format compatible with an electronic contact list application.

45. A method for providing a transcription service comprising:
providing access to a user to audio data, the audio data stored in a database;
receiving input from the user, the input indicating the audio data is to be transcribed; and
forwarding the audio data from the database to a data file gateway.

46. The method of claim 45 further comprising:
receiving transcription preference information, the transcription preference information forwarded with the data file to the data file gateway.

47. The method of claim 45 wherein providing access to the data file and receiving input are implemented through a voice activated interface.

48. The method of claim 45 wherein providing access to the data file and receiving input are implemented through a keypad interface on a telephone device.

49. The method of claim 45 further comprising:
receiving transcription billing information from a server.

50. A method for managing a pool of transcribers providing transcriptions over a network, comprising:
receiving feedback on a transcription provided by a transcriber, the feedback received by a transcription server, the transcription received by the transcription server from the transcriber over a network;
determining a rating for the transcriber, the rating based at least in part on the feedback received; and
determining compensation for the transcriber based on the rating for the transcriber.

51. The method of claim 50 further comprising:
determining whether an event occurs associated with a transcriber; and if the event occurs, performing an action regarding the transcriber.

52. The method of claim 51 wherein the event includes the transcriber's rating dropping below a threshold level.

53. The method of claim 51 wherein the event includes a transcriber's failure to perform transcription services.

54. The method of claim 51 wherein the action includes initiating the transmission of an audio file to be transcribed to several transcribers, the several transcribers including the transcriber associated with the event, the transcription received from each of the several transcribers compared to cross-check the transcription received from the transcriber associated with the event.

55. The method of claim 51 wherein the action includes initiating the transmission of at least one test vector the transcriber, the test vector including an audio file generated by the transcription server.

56. The method of claim 51 wherein the action includes closing the transcriber's account with the system.

57. The method of claim 51 wherein the action includes adjusting transcriber compensation in real time.

58. The method of claim 56 wherein transcriber compensation is adjusted based on the volume of transcription requests.

59. The method of claim 56 wherein transcriber compensation is adjusted based on the number of available transcribers at any given time.

60. The method of claim 56 wherein transcriber compensation is adjusted based on transcriber performance history.

61. The method of claim 59 wherein performance history includes transcriber rating, speed, accuracy and availability history.

62. A method for providing a high quality transcription service over a network comprising:
sending audio data from a server to a selected transcriber over a network;
receiving a transcription from the transcriber, the transcription associated with the audio data; and
analyzing the transcription by the server.

63. The method as claimed in claim 62 wherein sending audio data includes sending a test vector, analyzing the transcription including comparing the transcription to a perfect text transcription of the audio file to determine the accuracy of the selected transcriber.

64. The method as claimed in claim 62 wherein analyzing the transcription includes detecting profanity in the transcription.

65. The method of claim 62 further comprising updating the transcriber profile.

66. The method of claim 65 wherein the transcriber profile is updated in real time.

67. The method of claim 65 wherein the transcriber profile is updated automatically by the system based on the results of test vectors.

68. A method for compensating transcribers for transcriptions provided by the transcriber over a network comprising:
receiving a transcription request;
determining a base transcription cost;
determining a transcriber to perform a transcription associated with the transcription request; and
determining a total transcriber compensation amount.

69. The method of claim 68 wherein determining a base transcription cost includes:
assessing transcription demand; and
determining the supply of transcribers.

70. The method of claim 68 further comprising:
providing the transcription request and the total transcriber compensation amount to a transcriber.

71. A computer program product for execution by a server computer for providing a transcription service over a network comprising:
computer code for receiving audio data from a requestor, at least a portion of the audio data to be transcribed by a transcriber;
computer code for accessing a requestor profile associated with the requestor;
computer code for selecting a transcriber to transcribe at least a portion of the audio data, the transcriber selected based on a transcriber profile associated with the transcriber and the requestor profile; and
computer code for transmitting at least a portion of the audio data to the transcriber over a network.

72. The computer program product of claim 71 wherein receiving the audio data includes:
computer code for receiving supplementary audio file information and an audio file, the supplementary audio file information corresponding to the audio file and stored in a database, the audio file to be transcribed by the selected transcriber.

73. The computer program product of claim 72 wherein selecting a transcriber includes:
computer code for comparing a transcriber profile to the transcription preferences to generate a score corresponding to the transcriber; and
computer code for comparing the score to a threshold value.

74. The computer program product of claim 71 further including:
computer code for processing the audio data based on a transcription preferences corresponding to the audio data, wherein processing includes segmenting the audio data into segments, wherein each segment is sent to a different transcriber over the network.

75. The computer program product of claim 71 further including:
computer code for processing the audio data based on a transcription preferences corresponding to the audio data, wherein processing includes voice masking the audio data.

76. A computer program product for execution by a server computer for providing a transcription service over a network comprising:
computer code for receiving a transcription from a transcriber, the transcription corresponding to audio data provided by a requestor;
computer code for transmitting the transcription to the requestor;
computer code for receiving feedback from the requestor; and
computer code for updating a transcriber rating associated with the transcriber who generated the transcription.

77. The computer program product of claim 76 further comprising:
computer code for assembling received transcription segments, wherein the received transcription is one of the received transcription segments, the received transcription segments corresponding to audio data segments created from the audio data provided by the requestor, wherein transmitting the transcription includes transmitting a completely assembled transcription.

78. The computer program product of claim 76 further comprising:
computer code for monitoring the transcriber rating corresponding to each transcriber within a transcriber pool, wherein monitoring includes:
determining whether an event occurs related to a transcriber; and
if the event occurs, performing an action.

79. A computer program product for execution by a server computer for providing a transcription service over a network comprising:
computer code for identifying a transcriber located at a workstation, the transcriber associated with a transcriber profile and a transcriber rating, the profile and rating stored in the database;
computer code for receiving a work request input initiated by the transcriber, the work request input indicating the transcriber is requesting transcription work;
computer code for routing an audio file to the transcriber, the audio file associated with a transcription preferences, the transcriber profile determined to have matched the transcription preferences;

computer code for receiving a transcription of the audio file from the transcriber; and computer code for updating the transcriber rating based upon the transcription received.

80. A computer program product for execution by a server computer for providing a transcription service comprising:

computer code for providing access to a user to audio data, the audio data stored in a database;

computer code for receiving input from the user, the input indicating the audio data is to be transcribed; and computer code for forwarding the audio data from the database to a data file gateway.

81. A computer program product for execution by a server computer for managing a pool of transcribers providing transcriptions over a network, comprising:

computer code for receiving feedback on a transcription provided by a transcriber, the feedback received by a transcription server, the transcription received by the transcription server from the transcriber over a network;

computer code for determining a rating for the transcriber, the rating based at least in part on the feedback received; and computer code for determining compensation for the transcriber based on the rating for the transcriber.

82. A computer program product for execution by a server computer for providing a high quality transcription service over a network comprising:

computer code for sending audio data from a server to a selected transcriber over a network;

computer code for receiving a transcription from the transcriber, the transcription associated with the audio data; and computer code for analyzing the transcription by the server.

83. The computer program product as claimed in claim 82 wherein sending audio data includes sending a test vector, analyzing the transcription including comparing the transcription to a perfect text transcription of the audio file to determine the accuracy of the selected transcriber.

84. A computer program product for execution by a server computer for compensating transcribers for transcriptions provided by the transcriber over a network comprising:

computer code for receiving a transcription request;

computer code for determining a base transcription cost, wherein determining the base transcription cost includes:

assessing transcription demand; and determining the supply of transcribers;

computer code for determining a transcriber to perform a transcription associated with the transcription request; and computer code for determining a total transcriber compensation amount.

* * * * *

UNITED STATES PATENT AND TRADEMARK OFFICE
CERTIFICATE OF CORRECTION

PATENT NO. : 7,016,844 B2 Page 1 of 4
APPLICATION NO. : 10/255998
DATED : March 21, 2006
INVENTOR(S) : Konstantin Othmer and Michael P. Ruf It is certified that error appears in the above-identified patent and that said Letters Patent is hereby corrected as shown below:

TITLE PAGE
Item 57, ABSTRACT, line 5, change "file, transcription" to --file. Transcription--
Item 57, ABSTRACT, line 12, before "The transcription" insert --Processing the request may include determining compensation in real time based upon transcription demand and transcriber supply.--

Column 7
Line 17, change "itself In" to --itself. In--

Column 8
Line 46, change "then" to --than--

Column 10
Line 3, change "audio file." to --audio file in step 510.--

Column 15
Line 20, change "(contain" to --contain--

Column 17
Line 58, change "pager of" to --pager, or--
Line 61, change "supple" to --supply--

Column 18
Line 27, after "process" remove ","

Column 20
Line 53, change "1085" to --1185--

Column 22
Line 29, change "date" to --data--

Column 24
Claim 1, lines 45–47, change
    "receiving feedback from the requestor; and
    updating a transcriber rating associated with the transcriber who generated the
        transcription."
to
    --determining a performance history for a transcriber; and
    determining compensation for the transcriber based on the performance history
        for the transcriber.--

UNITED STATES PATENT AND TRADEMARK OFFICE
CERTIFICATE OF CORRECTION

PATENT NO. : 7,016,844 B2
APPLICATION NO. : 10/255998
DATED : March 21, 2006
INVENTOR(S) : Konstantin Othmer and Michael P. Ruf It is certified that error appears in the above-identified patent and that said Letters Patent is hereby corrected as shown below:

Column 25
Claim 10, line 35, change "the transcriber" to --a transcriber--

Column 26
Claim 26, line 52, remove "receiving feedback from the requester;"

Column 27
Claim 31, line 12, change "the transcriber rating" to --a transcriber performance history--
Claim 41, line 65, remove "tag"
Claim 42, line 66, remove "tag"

Column 28
Claim 43, line 4, remove "tag"
Claim 44, line 9, remove "tag"
Claim 50, lines 36–43, change
"receiving feedback on a transcription provided by a transcriber, the feedback received by a transcription server, the transcription received by the transcription server from the transcriber over a network;
determining a rating for the transcriber, the rating based at least in part on the feedback received; and
determining compensation for the transcriber based on the rating for the transcriber."
to
--determining a performance history for a transcriber; and
determining compensation for the transcriber based on the performance history for the transcriber.--
Claim 51, lines 45 and 46, change "a transcriber" to --the transcriber--
Claim 52, line 49 and 50, change "the transcriber's rating dropping below a threshold level." to --a transcriber rating dropping below a threshold level, the transcriber rating associated with the transcriber.--
Claim 55, line 61, change "vector the" to --vector to the--
Claim 55, line 63, change "the transcription server" to --a transcription server--
Claim 56, line 65, change "the transcriber's account with the system." to --a transcriber account with the system, the transcriber account associated the transcriber.--

UNITED STATES PATENT AND TRADEMARK OFFICE
CERTIFICATE OF CORRECTION

| | | |
|---|---|---|
| PATENT NO. | : 7,016,844 B2 | Page 3 of 4 |
| APPLICATION NO. | : 10/255998 | |
| DATED | : March 21, 2006 | |
| INVENTOR(S) | : Konstantin Othmer and Michael P. Ruf | |

It is certified that error appears in the above-identified patent and that said Letters Patent is hereby corrected as shown below:

Column 29
Claim 58, lines 1 and 2, change "The method of claim 56 wherein transcriber compensation is adjusted based on the volume" to --The method of claim 50 wherein determining compensation for the transcriber includes: adjusting transcriber compensation based on the volume--
Claim 59, lines 4 and 5, change "The method of claim 56 wherein transcriber compensation is adjusted based on the number" to --The method of claim 50 wherein determining compensation for the transcriber includes: adjusting transcriber compensation based on the number--
Claim 60, delete claim 60.
Claim 61, line 9, change "claim 59" to --claim 50--
Claim 65, line 28, change "the transcriber profile." to --a performance history associated with the transcriber.--
Claim 66, line 30, change "transcriber profile" to --performance history--
Claim 67, lines 32–34, change "The method of claim 65 wherein the transcriber profile is updated automatically by the system based on the results of test vectors." to --The method of claim 63 further comprising: updating a performance history associated with the transcriber, wherein the performance history is updated automatically based on the comparison of the transcription to the perfect test transcription.--

Column 30
Claim 76, line 32, remove "computer code for receiving feedback from the requestor;"
Claim 78, line 48, change "the transcriber rating" to --a transcriber performance history--

UNITED STATES PATENT AND TRADEMARK OFFICE
CERTIFICATE OF CORRECTION

| | | |
|---|---|---|
| PATENT NO. | : 7,016,844 B2 | |
| APPLICATION NO. | : 10/255998 | |
| DATED | : March 21, 2006 | |
| INVENTOR(S) | : Konstantin Othmer and Michael P. Ruf | |

It is certified that error appears in the above-identified patent and that said Letters Patent is hereby corrected as shown below:

<u>Column 31</u>
Claim 81, change
    "computer code for receiving feedback on a transcription provided by a
        transcriber, the feedback received by a transcription server, the
        transcription received by the transcription server from the transcriber
        over a network;
    computer code for determining a rating for the transcriber, the rating based at
        least in part on the feedback received; and
    computer code for determining compensation for the transcriber based on the
        rating for the transcriber."
to
--computer code for determining a performance history for a transcriber; and
computer code for determining compensation for the transcriber based on the
        performance history for the transcriber.--

Signed and Sealed this

Thirtieth Day of October, 2007

JON W. DUDAS
*Director of the United States Patent and Trademark Office*